United States Patent
Usukura et al.

(10) Patent No.: US 11,747,616 B2
(45) Date of Patent: Sep. 5, 2023

(54) DISPLAY DEVICE AND HEAD MOUNTED DISPLAY

(71) Applicant: SHARP KABUSHIKI KAISHA, Sakai (JP)

(72) Inventors: Naru Usukura, Sakai (JP); Hiromi Katoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 347 days.

(21) Appl. No.: 16/632,825

(22) PCT Filed: Jul. 17, 2018

(86) PCT No.: PCT/JP2018/026662
§ 371 (c)(1),
(2) Date: Jan. 21, 2020

(87) PCT Pub. No.: WO2019/021877
PCT Pub. Date: Jan. 31, 2019

(65) Prior Publication Data
US 2021/0132374 A1  May 6, 2021

(30) Foreign Application Priority Data
Jul. 24, 2017 (JP) .................. 2017-142626

(51) Int. Cl.
G02B 27/00 (2006.01)
G02B 3/00 (2006.01)
G02F 1/1335 (2006.01)
G06F 1/16 (2006.01)

(52) U.S. Cl.
CPC ............ *G02B 27/0025* (2013.01); *G02B 3/00* (2013.01); *G02F 1/133514* (2013.01); *G06F 1/163* (2013.01); *G02B 2003/0093* (2013.01)

(58) Field of Classification Search
CPC .................. G02B 27/0025; G02B 3/00; G02B 2003/0093; G02F 1/133514; G06F 1/163
USPC ......................................................... 359/891
See application file for complete search history.

(56) References Cited

U.S. PATENT DOCUMENTS

| 2010/0091027 A1 | 4/2010 | Oyama et al. |
| 2014/0293245 A1* | 10/2014 | Tani .................. G03B 21/2053 353/121 |
| 2014/0327604 A1 | 11/2014 | Oyama et al. |

FOREIGN PATENT DOCUMENTS

JP  2010-096864 A  4/2010

* cited by examiner

*Primary Examiner* — Joseph P Martinez
*Assistant Examiner* — Mitchell T Oestreich
(74) *Attorney, Agent, or Firm* — ScienBiziP, P.C.

(57) ABSTRACT

A display device includes a display member, a lens, and a light intensity adjuster. The display member is configured to display an image by releasing relatively short-wavelength light and relatively long-wavelength light. The lens is configured to allow the image on the display member to be reproduced on an eye of the user and thicker in the middle thereof than at the periphery thereof. The light intensity adjuster is included in the display member. The light intensity is configured to allow short-wavelength light to be released from a middle of the display member in a larger amount than both short-wavelength light to be released from ends of the display member and long-wavelength light to be released from the middle of the display member.

9 Claims, 18 Drawing Sheets

FIG.4

| INCIDENT ANGLE (°) | OPTICAL PATH LENGTH (mm) |
|---|---|
| 0 | 36.13 |
| 5 | 35.72 |
| 10 | 34.53 |
| 15 | 32.46 |
| 20 | 29.39 |
| 25 | 25.10 |
| 30 | 19.20 |
| 35 | 10.90 |

DISPLAY DEVICE AND HEAD MOUNTED DISPLAY

TECHNICAL FIELD

The present invention relates to a display device and a head mounted display.

BACKGROUND ART

A known example of a display device is described in Patent Document 1 listed below. The display device in Patent Document 1 includes a unit for obtaining information relating to aberrations of a display optical system and a unit for obtaining information relating to aberrations of a vision correction optical system used by the viewer. The display device performs aberration correction by referring to the two kinds of aberrations.

RELATED ART DOCUMENT

Patent Document
Patent Document 1: Japanese Unexamined Patent Application Publication No. 2010-96864

Problem to be Solved by the Invention

The display device described in Patent Document 1 can properly correct the combined aberrations of the display optical system and the vision correction optical system used by the viewer for each person. In general, a lens used in a display optical system has spectral transmittance characteristics in which the transmittance for short-wavelength visible light is lower than the transmittance for long-wavelength visible light. The lens, which has an uneven thickness, may tint the light passing therethrough with a particular color at a thicker or thinner portion, and the user may recognize the tinted color.

DISCLOSURE OF THE PRESENT INVENTION

The present invention was made in view of the above-described circumstance, and an object thereof is to reduce the color unevenness.

Means for Solving the Problem

A display device according to the present invention includes a display member that displays an image by releasing relatively short-wavelength light and relatively long-wavelength light, a lens that allows the image on the display member to be reproduced on an eye of the user and is thicker in the middle than at the periphery, and a light intensity adjuster that is included in the display member and that allows the short-wavelength light to be released from a middle of the display member in a larger amount than both the short-wavelength light to be released from ends of the display member and the long-wavelength light to be released from the middle of the display member.

In this configuration, the display member displays an image by releasing relatively short-wavelength light and relatively long-wavelength light. The image displayed on the display member is reproduced on the eye of the user by the lens. The lens, which is thicker in the middle than at the periphery, allows the user to see the enlarged image of the image displayed on the display member.

In general, the lens has a spectral transmittance in which the transmittance for short-wavelength visible light is lower than the transmittance for long-wavelength visible light. Thus, the light passing through the middle of the lens, which is relatively thick, is more likely to be tinged with a particular color than the light passing through the periphery of the lens. To overcome the problem, the light intensity adjuster included in the display member allows the short-wavelength light to be released from the middle of the display member in a larger amount than the short-wavelength light that is released from the ends of the display member and the long-wavelength light that is released from the middle of the display member. Thus, the lens receives more short-wavelength light in the middle than at the periphery, and the amount of short-wavelength light received by the middle of the lens is unlikely to be insufficient when compared with the amount of long-wavelength light. Thus, the light passing through the middle of the lens is unlikely to be tinged with a particular color.

Advantageous Effect of the Invention

According to the present invention, color unevenness is reduced.

BRIEF DESCRIPTION OF THE DRAWINGS

FIG. 4 is a table indicating a relationship between an incident angle of light entering a light incident surface of the lens and an optical path length of light passing through the lens.

MODES FOR CARRYING OUT THE INVENTION

First Embodiment

A first embodiment of the invention is described with reference to FIGS. 1 to 6. In this embodiment, a goggle head-mounted display HMD and a liquid crystal display device (display device) 10 included in the head-mounted display HMD are described. The X axis, the Y axis, and the Z axis are indicated in some of the drawings, and each of the axes indicates the same direction in the respective drawings.

Figure 1:
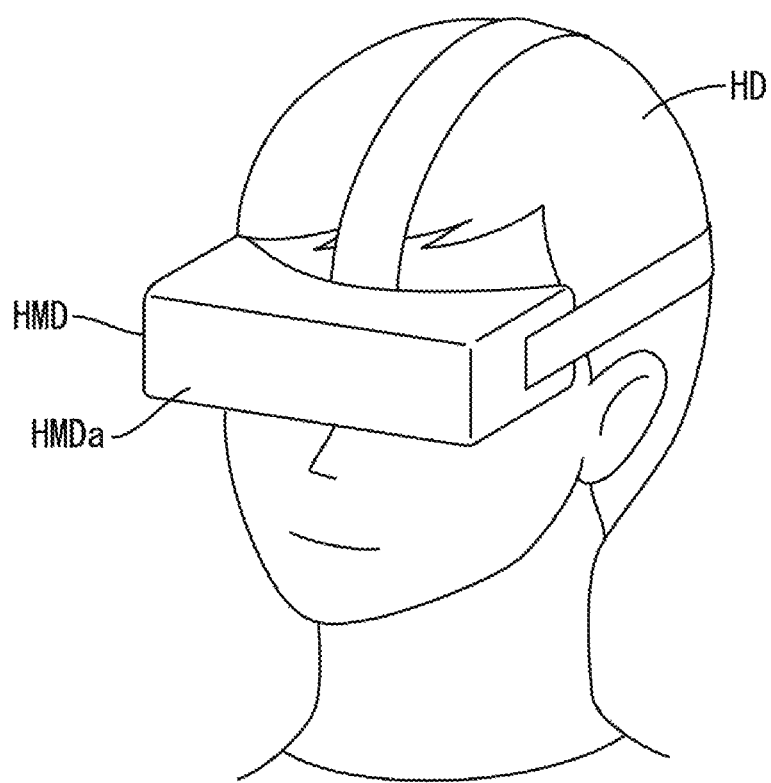
FIG. 1 is a schematic perspective view illustrating a head-mounted display according to a first embodiment of the invention worn on a head of a user.
Figure 2:
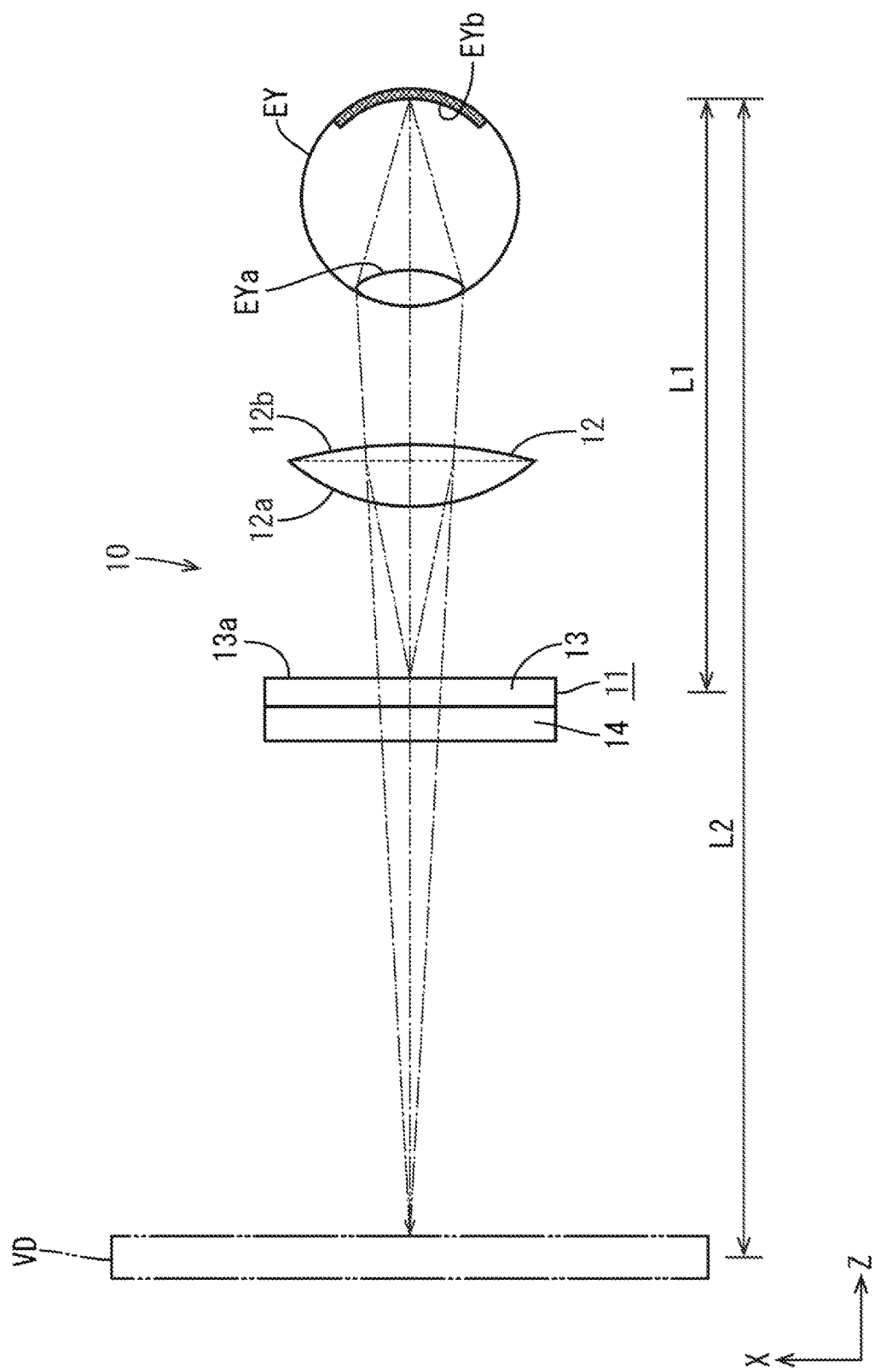
FIG. 2 is a schematic side view indicating an optical relationship between a liquid crystal display member, a lens, an eyeball of a user, and a virtual display. The liquid crystal display member and the lens are included in a head mounted device of the head-mounted display.
Figure 3:
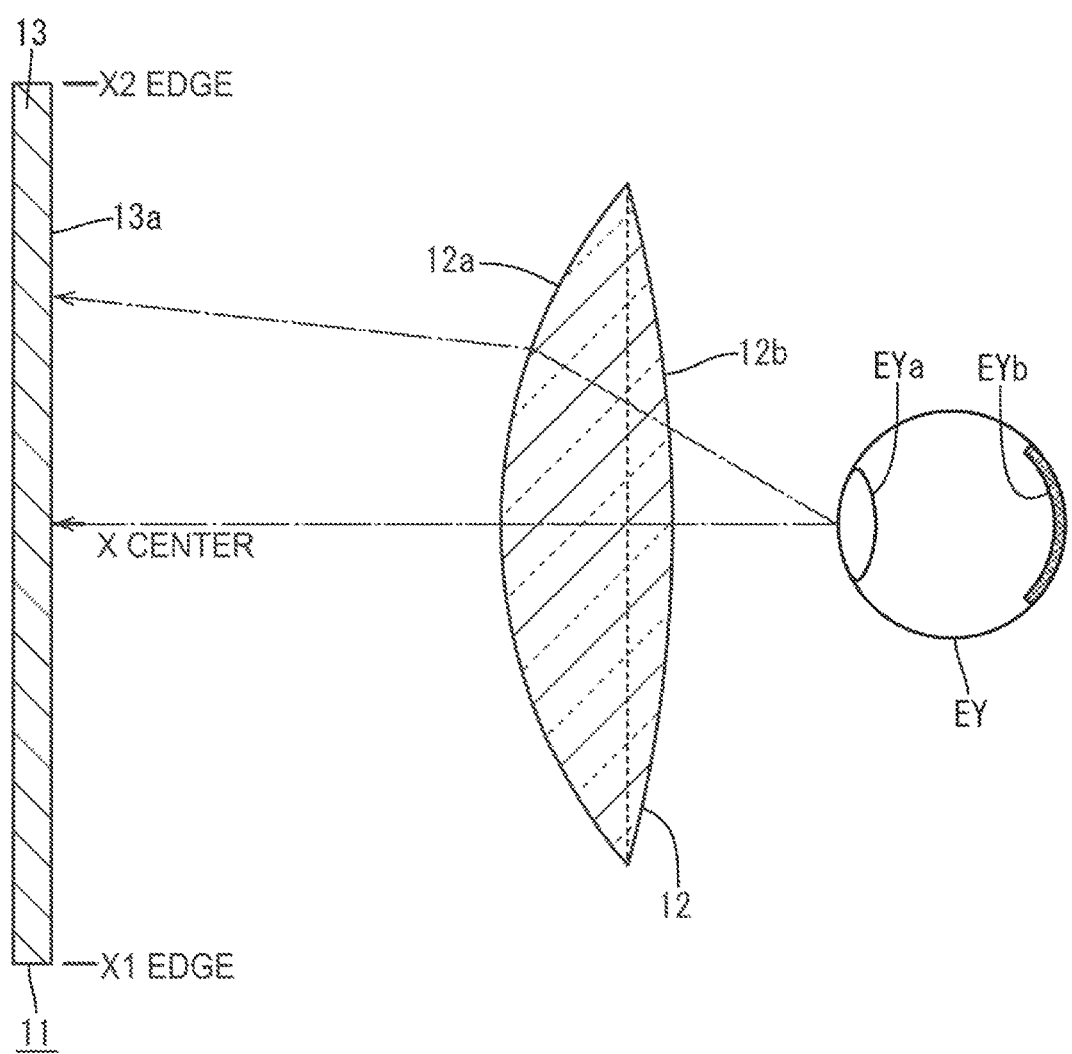
FIG. 3 is a side view illustrating the liquid crystal display member, the lens, and the eyeball of the user.

As illustrated in FIG. 1, the goggle head-mounted display HMD includes a head-mounted device HMDa that covers the eyes of the user when worn on the head HD of the user. As illustrated in FIG. 2, the head-mounted device HMDa includes the liquid crystal display device 10. The liquid crystal display device 10 includes at least a liquid crystal display member (display member) 11 that displays an image and a lens (ocular lens) 12 that allows the image on the liquid crystal display member 11 to be reproduced on an eyeball (eye) EY of the user. The liquid crystal display member 11 includes at least a liquid crystal panel (display panel) 13 having a display surface 13a on which an image is displayed and a backlight device (lighting device) 14 that applies display light to the liquid crystal panel 13. The lens 12 is positioned between the liquid crystal display member 11 and the eyeball EY of the user and refracts the light passing therethrough. Adjustment of the focal length of the lens 12 allows the user to recognize an image that has been formed on the retina (eye) EYb by the crystalline lens EYa of the eyeball EY as if being displayed on a virtual display VD positioned away from the eyeball EY by the distance L2, which is longer than the actual distance L1 between the eyeball EY and the liquid crystal display member 11. This configuration enables the user to see an enlarged image (virtual image) on the virtual display VD having a screen size (for example, ranging from about a few tens of inches to a few hundred inches) larger than the screen size (for example, ranging from about two inches to seven inches) of the liquid crystal display member 11. The head-mounted device HMDa may include one liquid crystal display member 11 that displays images for right and left eyes. Alternatively, the head-mounted device HMDa may include two liquid crystal display members 11: one displays an image for a right eye and the other displays an image for a left eye. When the head-mounted device HMDa includes one liquid crystal display member 11, the screen size of the liquid crystal display member 11 ranges, for example, from about 5 inches to about 7 inches. When the head-mounted device HMDa includes two liquid crystal display members 11, the screen size of each of the liquid crystal display members 11 ranges, for example, from about 2 inches to about 3.5 inches. Although not illustrated, the head-mounted device HMDa includes accessories, such as an earphone that is worn in the ear of the user for listening to sound.

Figure 5:
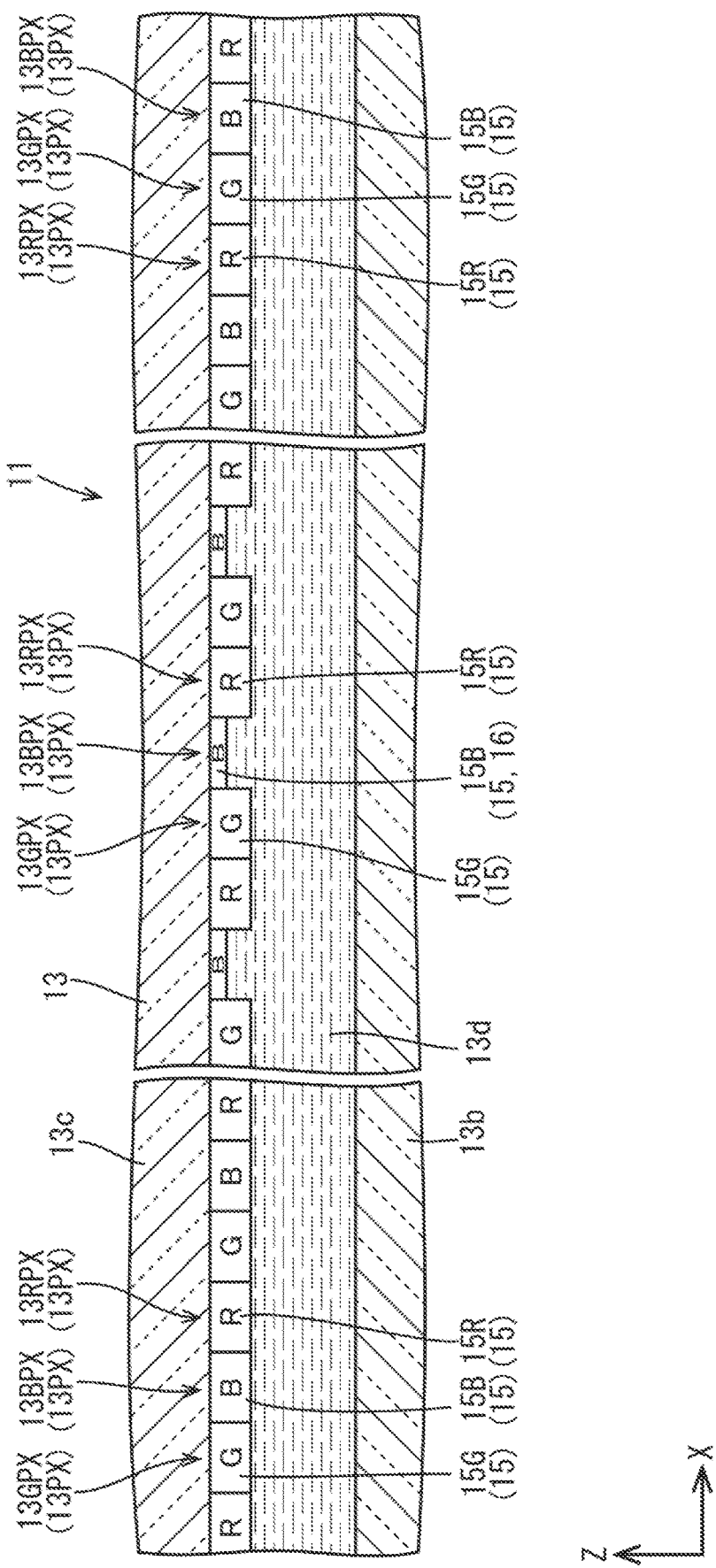
FIG. 5 is a schematic cross-sectional view illustrating a liquid crystal panel included in the liquid crystal display member.

Next, the liquid crystal panel 13 and the backlight device 14 included in the liquid crystal display member 11 are described. The backlight device 14 is briefly described first. The backlight device 14 is disposed behind (on the rear side of) the liquid crystal panel 13 and includes a light source (for example, an LED) that emits white light and an optical member that exerts optical effects on light from the light source to convert the light into planar light. As illustrated in FIG. 2, the liquid crystal panel 13 has a substantially plate-like overall shape and the surface adjacent to the lens 12 is a display surface 13a on which an image is displayed. As illustrated in FIG. 5, the liquid crystal panel 13 includes at least two glass substrates 13b and 13c attached to each other with a predetermined gap therebetween, a liquid crystal layer 13d sealed between the substrates 13b and 13c and containing liquid crystal molecules, which are substances whose optical properties are changed by application of an electric field, and two polarizing plates (not illustrated) attached to outer surfaces of the substrates 13b and 13c. The display surface 13a of the liquid crystal panel 13 extends in the X axis direction and the Y axis direction of the drawings. The direction normal to the display surface 13a of the liquid crystal panel 13 extends in the Z axis direction. One of the substrates 13b and 13c of the liquid crystal panel 13 that is located adjacent to the backlight device 14 is an array substrate (TFT substrate, active matrix substrate) 13b. Although not illustrated in detail, the array substrate 13b has switching elements (such as TFTs), which are connected to the source lines and the gate lines arranged perpendicular to each other, and pixel electrodes, which are located in the rectangular areas defined by the source lines and the gate lines and are connected to the switching elements, and an alignment film. The switching elements and the pixel electrodes are arranged in a matrix in a plan view.

One of the substrates 13b and 13c of the liquid crystal panel 13 away from the backlight device 14 is a CF substrate (counter substrate) 13c. As illustrated in FIG. 5, the CF substrate 13c has color filters (wavelength-selective light transmissive portions) 15 arranged in a matrix and facing the pixel electrodes on the array substrate 13b, a grid-patterned light-blocking portion (black matrix) positioned between the color filters 15, a solid-pattern counter electrode facing the pixel electrodes, and an alignment film. The color filters 15 and the pixel electrodes, which face each other, constitute pixels 13PX that selectively transmit light emitted by the backlight device 14 toward the lens 12. The color filters 15 include red color filters (long-wavelength-light transmissive portions) 15R, green color filters (long-wavelength-light transmissive portions, short-wavelength light transmissive portions) 15G, and blue color filters (short-wavelength-light transmissive portions) 15B. The color filters 15 in three colors are repeatedly alternately arranged in a predetermined order in the X axis direction. The color filters 15 contain pigments corresponding to the colors of the color filters 15 and absorb light rays having colors different from the pigments to selectively transmit light rays having the colors of the color filters 15 (light rays having a particular color). Specifically described, the red color filter 15R mainly selectively transmits light having a wavelength in a wavelength range of red (for example, about 600 nm to about 780 nm) or red light and constitutes a red pixel (long-wavelength pixel) 13RPX, which releases red light, together with the opposing pixel electrode. The green color filter 15G mainly selectively transmits light having a wavelength in a wavelength range of green (for example, about 500 nm to about 570 nm) or green light and constitutes a green pixel (long-wavelength pixel, short-wavelength pixel) 13GPX, which release green light, together with the opposing pixel electrode. The blue color filter 15B mainly selectively transmits light having a wavelength in a wavelength range of blue (for example, about 420 nm to about 500 nm) or blue light and constitutes a blue pixel (short-wavelength pixel) 13BPX, which release blue light, together with the opposing pixel electrode.

In the liquid crystal panel 13 having such a configuration, the red, green, and blue pixels 13RPX, 13GPX, and 13BPX of three colors that are adjacent to each other in the X axis direction constitute a display pixel that provides a color display of a predetermined gray level. Multiple display pixels each including the three pixels 13RPX, 13GPX, and 13BPX are repeatedly arranged on the display surface 13a of the liquid crystal panel 13 in the X axis direction (column direction) to form a display pixel group. Multiple display pixel groups are arranged in the Y axis direction (row direction). The TFTs connected to the respective pixel electrodes of the pixels 13PX included in the display pixels are controlled such that the pixel electrodes are charged, and thus a potential difference is generated between the pixel electrodes and the counter electrode. The potential difference changes the alignment state of the liquid crystal molecules contained in the liquid crystal layer 13d, and the polarization state of the transmitting light changes in accordance with the change in the alignment state. In this way, the amount of light passing through the liquid crystal panel 13 is controlled for each of the pixels 13PX and thus a predetermined color image is displayed.

As illustrated in FIG. 2, the lens 12 is a convex lens, which focuses (concentrates) parallel incident light beams. Specifically described, the lens 12 has a light entering surface (surface through which light enters) 12a facing the liquid crystal display member 11 and a light exiting surface (surface through which light exits) 12b facing the eyeball EY of the user. The lens 12 is a double convex lens in which both the light entering surface 12a and the light exiting surface 12b are convex. The lens 12 is thicker in the middle than at the periphery. Specifically described, the lens 12 is thickest at the center and thinnest at the outer edge. The thickness of the lens 12 gradually decreases (continuously gradually decreases) from the middle to the periphery. The lens 12 is an aspheric lens in which both the light entering surface 12a and the light exiting surface 12b are aspheric. The lens 12, which is thicker in the middle than at the periphery, allows the user to see an enlarged image of the image displayed on the liquid crystal display member 11.

As illustrated in FIG. 2, the lens 12 is formed of a substantially transparent highly light-transmissive material (for example, an acrylic resin (such as polymethyl methacrylate) having a refractive index ranging from about 1.48 to about 1.75, preferably a refractive index of 1.75. The material of the lens 12 may have any other refractive index than the above. In the lens 12, the radius of curvature of the light entering surface 12a is relatively small and the radius of curvature of the light exiting surface 12b is relatively large. Specifically described, the light entering surface 12a of the lens 12 has a radius of curvature ranging from about 25 mm to about 38 mm, preferably 38 mm. In contrast, the light exiting surface 12b of the lens 12 has a radius of curvature ranging from about 80 mm to about 250 mm, preferably 95 mm. The light entering surface 12a and the light exiting surface 12b of the lens 12 each may have any other radius of curvature than the above. The conic constant K of the light entering surface 12a and that of the light exiting surface 12b of the lens 12 are both "−1". In other words, the light entering surface 12a and the light exiting surface 12b are both paraboloid and focus parallel light beams with no aberrations. The light entering surface 12a and the light exiting surface 12b of the lens 12 each may have any other specific conic constant K other than the above.

In general, the lens 12 has spectral transmittance characteristics in which the transmittance for short-wavelength visible light (such as violet light and blue light) is lower than the transmittance for long-wavelength visible light (such as green light and red light) and has wavelength dependence of refractive index in which a refractive index for short-wavelength light is higher than a refractive index for long-wavelength light. Thus, the light passing through the middle of the lens 12, which is thicker than the periphery, is likely to be tinged with a particular color (violet or blue), and the user may recognize the color unevenness. In particular, the lens 12 tends to be required to have a short focal point to obtain a wider viewing angle of the head-mounted display HMD. This may be achieved by making the radius of curvature of the light entering surface 12a of the lens 12 smaller or by forming the lens 12 with a material having a high refractive index. However, if the radius of curvature of the light entering surface 12a of the lens 12 is made smaller, the difference in thickness of the lens 12 between the middle and the periphery increases. This may increase the degree of the color unevenness. This is described in detail with reference to FIG. 4. FIG. 4 is a table indicating relationships between incident angels (°) of light entering the light entering surface 12a of the lens 12 and optical path lengths (mm) of light passing through the lens 12. Specifically described, as illustrated in FIG. 4, the light to pass through the middle of the lens 12 is incident on the light entering surface 12a of the lens 12 at an incident angle of 0° and has the longest optical path length of 36.13 mm. In contrast, the light to pass through the outer edge of the lens 12 is incident on the lens incident surface 12a at an incident angle of 35° and has the shortest optical path length of 10.90 mm, which is smaller than one third of the optical path length of the light to pass through the middle. The lens 12 having such a large difference in optical path length between the middle and the edge may cause a higher degree of color unevenness. Furthermore, if the lens 12 is formed of a material having a higher refractive index, the degree of color unevenness would be increased due to the wavelength dependence of the refractive index.

In view of the above, as illustrated in FIG. 5, the liquid crystal display member 11 of the present embodiment includes a light intensity adjuster 16 that allows blue light as the short-wavelength light to be released from the middle of the liquid crystal display member 11 in a larger amount than blue light as the short-wavelength light that is released from the ends and red light as long-wavelength light that is released from the middle. Specifically described, when the red, green, and blue color filters 15R, 15G, and 15B that are located at the ends of the liquid crystal display member 11 have the same thickness, the blue color filters 15B that are located in the middle of the liquid crystal panel 13 of the liquid crystal display member 11 are thinner than both the blue color filters 15B that are located at the ends and the red color filters 15R that are located in the middle and function as the light intensity adjuster 16. FIG. 5 is a schematic cross-sectional view of the liquid crystal panel 13 and illustrates the pixels 13PX that are located in the middle in the X axis direction (X center) and the pixels 13PX that are located at the ends in the X axis direction (adjacent to the X1 edge and the X2 edge) as examples.

Figure 6:
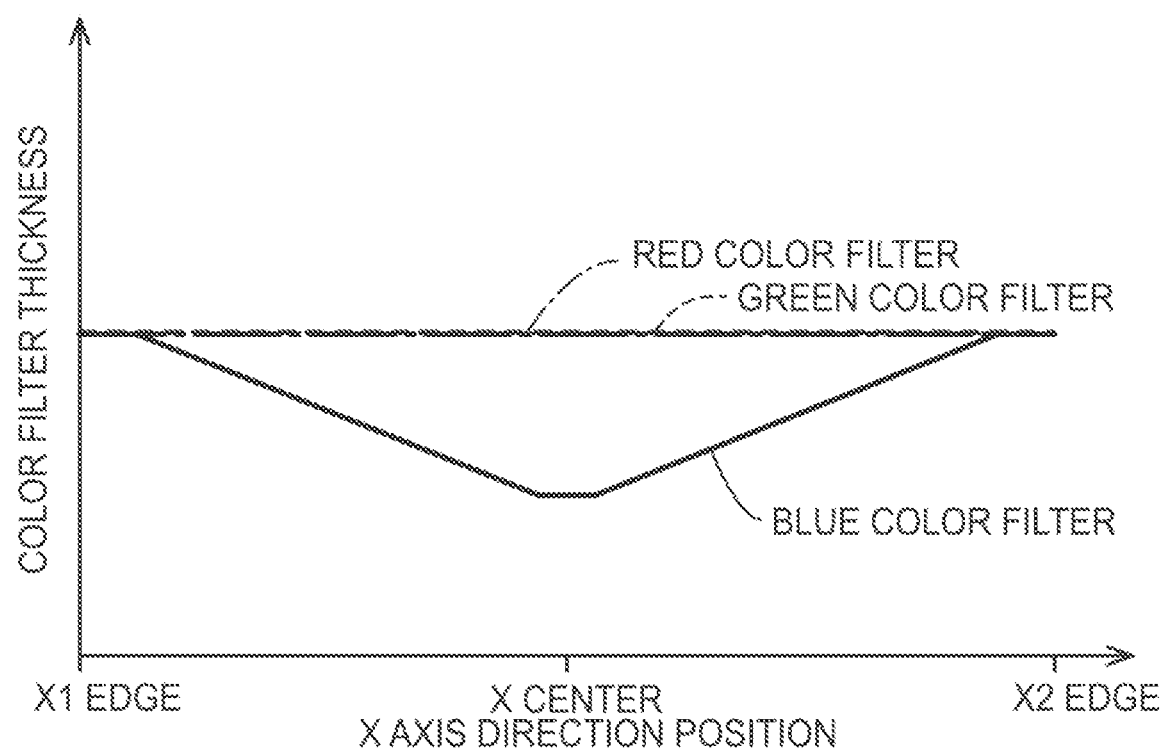
FIG. 6 is a graph indicating variations in thickness for red, green, and blue color filters in the liquid crystal panel from the X1 edge to the X2 edge.

The thickness distributions of the red, green, and blue color filters 15 are described in detail with reference to FIG. 6. FIG. 6 is a graph in which the thicknesses of the red, green, and blue color filters 15 are plotted from the X1 edge to the X2 edge in the X axis direction over the display surface 13a of the liquid crystal panel 13. In FIG. 6, the horizontal axis indicates positions in the X axis direction, and the vertical axis indicates thicknesses of the color filter 15. In FIG. 6, the solid line indicates thicknesses of the blue color filters 15B, the one-dot chain line indicates thicknesses of the red color filters 15R, and the broken line indicates thicknesses of the green color filters 15G. The positions of the X1 edge, the X center, and the X2 edge indicated in the horizontal axis in FIG. 6 correspond to the positions in FIG. 3. As indicated in FIG. 6, the green color filters 15G have the same thickness regardless of position in the X axis direction, and the red color filters 15R have the same thickness regardless of position in the X axis direction. The thickness of the green color filters 15G and the thickness of the red color filters 15R are substantially the same. In contrast, the blue color filters 15B show a gradual increase in thickness from the middle toward the edges in the X axis direction or, conversely a gradual decrease from the edges toward the middle. The thickness of the blue color filters 15B that are located at the ends in the X axis direction is substantially the same as the thickness of the green color filters 15G and the thickness of the red color filters 15R. The blue color filters 15B that are located in the middle in the X axis direction and function as the light intensity adjuster 16 are thinner than both the red color filters 15R that are located in the middle and the blue color filters 15B that are located at the ends.

The amount of light passing through the color filter 15 changes depending on the thickness. The color filter 15 absorbs more light and transmits less light as the thickness increases and absorbs less light and transmits more light as the thickness decreases. As illustrated in FIGS. 5 and 6, the blue color filters 15B that are located in the middle in the X axis direction are thinner than both the blue color filters 15B that are located at the ends and the red color filters 15R that are located in the middle and function as the light intensity adjuster 16, and thus the amount of blue light from the blue pixels 13BPX that are located in the middle is larger than both the amount of blue light from the blue pixels 13BPX that are located at the ends and the amount of red light from the red pixels 13RPX that are located in the middle. In this configuration, the lens 12 receives more blue light in the middle than at the periphery, and the amount of blue light received by the middle of the lens 12 is unlikely to be insufficient when compared with the amount of red light. Thus, the light passing through the middle of the lens 12 is reliably whitened and is unlikely to be tinged with a particular color or to be yellowish.

As described above, the liquid crystal display device (display device) 10 of this embodiment includes the liquid crystal display member (display member) 11 that displays an image by releasing relatively short-wavelength light and relatively long-wavelength light, the lens 12 that allows the image on the liquid crystal display member 11 to be reproduced on the eye ball (eye) EY of the user and is thicker in the middle than at the periphery, and the light intensity adjuster 16 that is included in the liquid crystal display member 11 and that allows the short-wavelength light to be released from a middle of the liquid crystal display member 11 in a larger amount than both the short-wavelength light to be released from ends of the liquid crystal display member 11 and the long-wavelength light to be released from the middle of the liquid crystal display member 11.

In this configuration, the liquid crystal display member 11 displays an image by releasing relatively short-wavelength light and relatively long-wavelength light. The image displayed on the liquid crystal display member 11 is reproduced on the eye EY of the user by the lens 12. The lens 12, which is thicker in the middle than at the periphery, allows the user to see the enlarged image of the image displayed on the liquid crystal display member 11.

In general, the lens 12 has a spectral transmittance in which the transmittance for short-wavelength visible light is lower than the transmittance for long-wavelength visible light. Thus, the light passing through the middle of the lens 12, which is relatively thick, is more likely to be tinged with a particular color than the light passing through the periphery of the lens 12. To overcome the problem, the light intensity adjuster 16 included in the liquid crystal display member 11 allows the short-wavelength light to be released from the middle of the liquid crystal display member 11 in a larger amount than both the short-wavelength light that is released from the ends of the liquid crystal display member 11 and the long-wavelength light that is released from the middle of the liquid crystal display member 11. Thus, the lens 12 receives more short-wavelength light in the middle than at the periphery, and the amount of short-wavelength light received by the middle of the lens 12 is unlikely to be insufficient when compared with the amount of long-wavelength light. Thus, the light passing through the middle of the lens 12 is unlikely to be tinged with a particular color.

Furthermore, the liquid crystal display member 11 includes the liquid crystal panel (display panel) 13 at least including the blue pixels (short-wavelength pixels) 13BPX, which release relatively short-wavelength light, and the red pixels (long-wavelength pixels) 13RPX, which release relatively long-wavelength light, and the backlight device (lighting device) 14 that applies display light to the liquid crystal panel 13. The blue pixels 13BPX include at least the blue color filters (short-wavelength-light transmissive portions) 15B that selectively transmit short-wavelength light. The red pixels 13RPX include at least the red color filters (long-wavelength-light transmissive portions) 15R that selectively transmit long-wavelength light. The light intensity adjuster 16 includes the blue color filters 15B that are located in the middle of the liquid crystal display member 11 and thinner than both the blue color filters 15B that are located at the ends and the red color filters 15R that are located in the middle. In this configuration, the liquid crystal panel 13 displays an image by using light from the backlight device 14. The blue pixels 13BPX of the liquid crystal panel 13 release short-wavelength light because the blue color filters 15B thereof selectively transmit short-wavelength light, and the red pixels 13RPX of the liquid crystal panel 13 release long-wavelength light because the red color filters 15R thereof selectively transmit long-wavelength light. The amount of light passing through each of the blue color filters 15B and the red color filters 15R changes depending on the thickness. The blue and red color filters 15B and 15R each transmit less light as the thickness increases and transmit more light as the thickness decreases. The blue color filters 15B that are located in the middle of the liquid crystal display member 11 are thinner than both the blue color filters 15B that are located at the ends and the red color filters 15R that are located in the middle and function as the light intensity adjuster 16, and thus the amount of short-wavelength light from the blue pixels 13BPX that are located in the middle is larger than both the amount of short-wavelength light from the blue pixels 13BPX that are located at the ends and the amount of long-wavelength light from the red pixels 13RPX that are located in the middle. In this configuration, the lens 12 receives more short-wavelength light in the middle than at the periphery, and the amount of short-wavelength light received by the middle of the lens 12 is unlikely to be insufficient when compared with the amount of long-wavelength light. Thus, the light passing through the middle of the lens 12 and is unlikely to be tinged with a particular color.

Furthermore, the liquid crystal display member 11 includes at least the short-wavelength pixels, which release relatively short-wavelength light, and the long-wavelength pixels, which release relatively long-wavelength light. The short-wavelength pixels are the blue pixels 13BPX, which release at least blue light as the short-wavelength light, and the long-wavelength pixels are the red pixels 13RPX, which release at least red light as the long-wavelength light. In this configuration, the light intensity adjuster 16 allows the amount of blue light from the blue pixels 13BPX as the long-wavelength pixels that are located in the middle of the liquid crystal display member 11 to be larger than both the amount of blue light from the blue pixels 13BPX that are located at the ends and the amount of red light from the red pixels 13RPX as the long-wavelength pixels that are located in the middle. Thus, the lens 12 receives more blue light in the middle than at the periphery, and the amount of blue light received by the middle of the lens 12 is less likely to be insufficient when compared with the amount of red light. Thus, light passing through the middle of the lens 12 is less likely to be yellowish.

Furthermore, the head-mounted display HMD of this embodiment includes at least the above-described liquid crystal display device 10 and the head-mounted display device HMDa holding the liquid crystal display device 10 and to be worn on the head HD of the user. The head-mounted display HMD having such a configuration enables, when the head-mounted display device HMDa is worn on the head HD, the image on the liquid crystal display member 11 of the liquid crystal display device 10 to be reproduced on the eye EY of the user by the lens 12, and thus the user sees the enlarged image of the image displayed on the liquid crystal display member 11. In the liquid crystal display device 10, the light passing through the middle of the lens 12 is unlikely to be tinged with a particular color, and thus the liquid crystal display device 10 has high display quality, allowing the user to have a deeper sense of immersion.

Second Embodiment

A second embodiment of the invention is described with reference to FIG. 7 or 8. In the second embodiment, the color filters 115 have a different configuration. Structures, operations, and effects similar to those in the first embodiment are not described.

Figure 7:
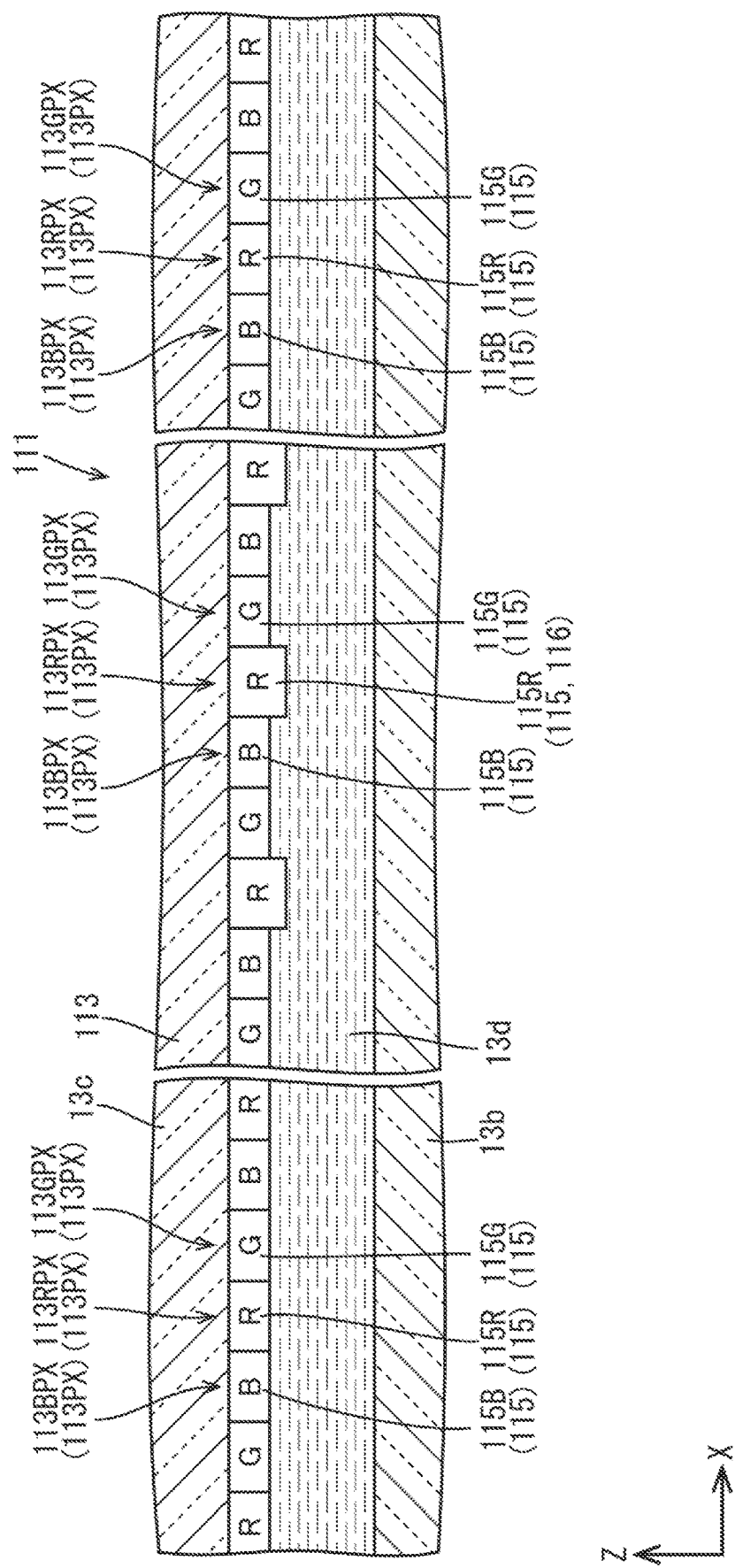
FIG. 7 is a schematic cross-sectional view illustrating a liquid crystal panel included in a liquid crystal display member according to a second embodiment of the invention.
Figure 8:
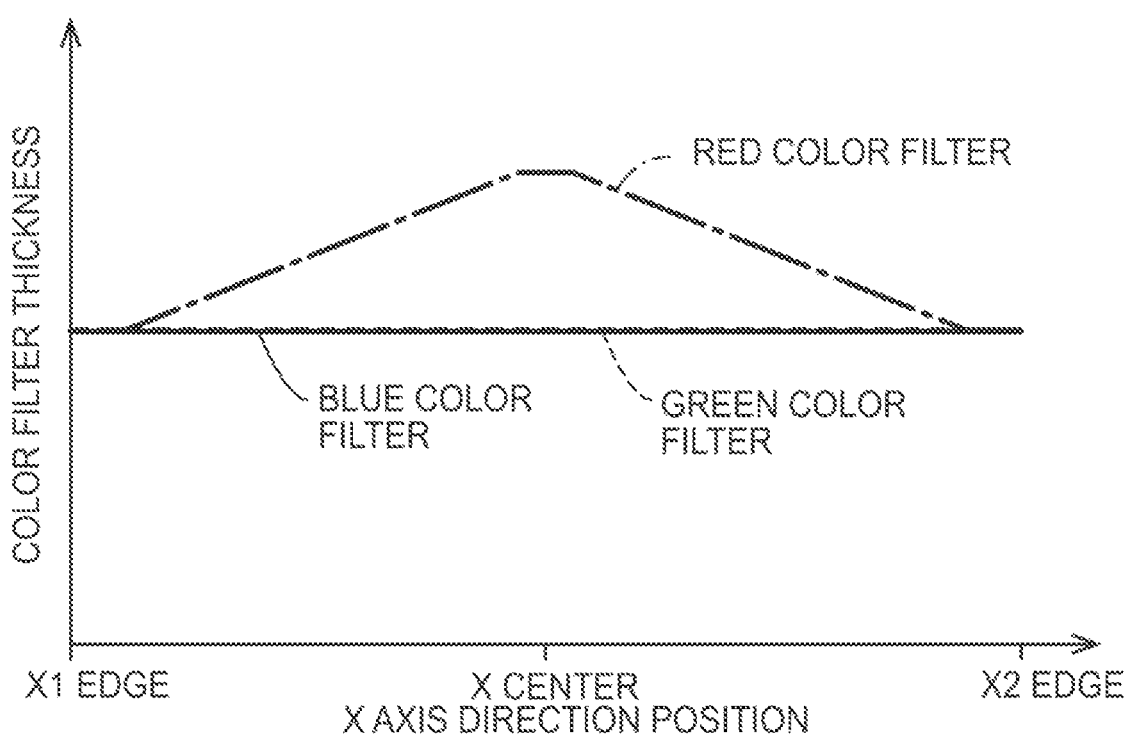
FIG. 8 is a graph indicating variations in thickness for red, green, and blue color filters in the liquid crystal panel from the X1 edge to the X2 edge.

As indicated in FIG. 7, in the color filters 115 of the pixels 113PX in this embodiment, the thickness of the red color filters 115R varies with positions in the X axis direction. When the red, green, and blue color filters 115R, 115G, and 115B that are located at the ends of the liquid crystal display member 111 have the same thickness, the red color filters 115R of the red pixels 113RPX that are located in the middle of the liquid crystal display member 111 are thicker than both the red color filters 115R that are located at the ends and the blue color filters 115B of the blue pixels 113BPX that are located in the middle. In other words, the red color filters 115R that are located in the middle of the liquid crystal display member 111 function as the light intensity adjuster 116 in this embodiment.

The thickness distributions of the red, green, and blue color filters 115 are described in detail with reference to FIG. 8. FIG. 8 is a graph similar to FIG. 6 in the first embodiment. As indicated FIG. 8, the blue color filters 115B have the same thickness regardless of position in the X axis direction, and the green color filters 115G of the green pixels 113GPX have the same thickness regardless of position in the X axis direction. The thickness of the blue color filters 115B and the thickness of the green color filters 115G are substantially the same. In contrast, the red color filters 115R show a gradual decrease in thickness from the middle toward the edges in the X axis direction or, conversely, a gradual increase in thickness from the edges toward the middle. The thickness of the red color filters 115R that are located at the ends in the X axis direction (adjacent to the X1 edge and the X2 edge) is substantially the same as the thickness of the blue color filters 115B and that of the green color filters 115G. Thus, the red color filters 115R that are located in the middle in the X axis direction (adjacent to the X center) and function as the light intensity adjuster 116 are thicker than both the blue color filters 115B that are located in the middle and the red color filters 115R that are located at the ends. In this configuration, the amount of red light from the red pixels 113RPX that are located in the middle is smaller than both the amount of red light from the red pixels 113RPX that are located at the ends and the amount of blue light from the blue pixels 113BPX that are located in the middle. Thus, the lens receives less red light in the middle than at the periphery, and the amount of blue light received by the middle of the lens is unlikely to be insufficient when compared with the amount of red light. Thus, the light passing through the middle of the lens is reliably whitened and is unlikely to be tinged with a particular color or to be yellowish.

As described above, according to this embodiment, the liquid crystal display member 111 includes the liquid crystal panel 113 including at least the blue pixels 113BPX, which release relatively short-wavelength light, and the red pixels 113RPX, which release relatively long-wavelength light, and the backlight device that applies display light to the liquid crystal panel 113. The blue pixels 113BPX include at least the blue color filters 115B that selectively transmit short-wavelength light and the red pixels 113RPX include at least the red color filters 115R that selectively transmit long-wavelength light. The light intensity adjuster 116 includes the red color filters 115R that are located in the middle of the liquid crystal display member 111 and thicker than both the red color filters 115R that are located at the ends and the blue color filters 115B that are located in the middle. In this configuration, the liquid crystal panel 113 displays an image by using light from the backlight device.

The blue pixels 113BPX of the liquid crystal panel 113 release short-wavelength light because the blue color filters 115B thereof selectively transmit short-wavelength light, and the red pixels 113RPX of the liquid crystal panel 113 release long-wavelength light because the red color filters 115R thereof selectively transmit long-wavelength light. The amount of light passing through each of the blue color filters 115B and the red color filters 115R changes depending on the thickness. The blue and red color filters 115B and 115R each transmit less light as the thickness increases and transmit more light as the thickness decreases. The red color filters 115R that are located in the middle of the liquid crystal display member 111 are thicker than both the red color filters 115R that are located at the ends and the blue color filter 115B that are located in the middle and function as the light intensity adjuster 116, and thus the amount of long-wavelength light from the red pixels 113RPX that are located in the middle is smaller than both the amount of long-wavelength light from the red pixels 113RPX that are located at the ends and the amount of short-wavelength light from the blue pixels 113BPX that are located in the middle. In this configuration, the lens receives less long-wavelength light in the middle than at the periphery, and the amount of short-wavelength light received by the middle of the lens is unlikely to be insufficient when compared with the amount of long-wavelength light. Thus, the light passing through the middle of the lens is unlikely to be tinged with a particular color.

Third Embodiment

A third embodiment of the invention is described with reference to FIG. 9 or 10. In the third embodiment, the pixels 213PX have a different configuration from the pixels in the first embodiment. Structures, operations, and effects similar to those in the first embodiment are not described.

Figure 9:
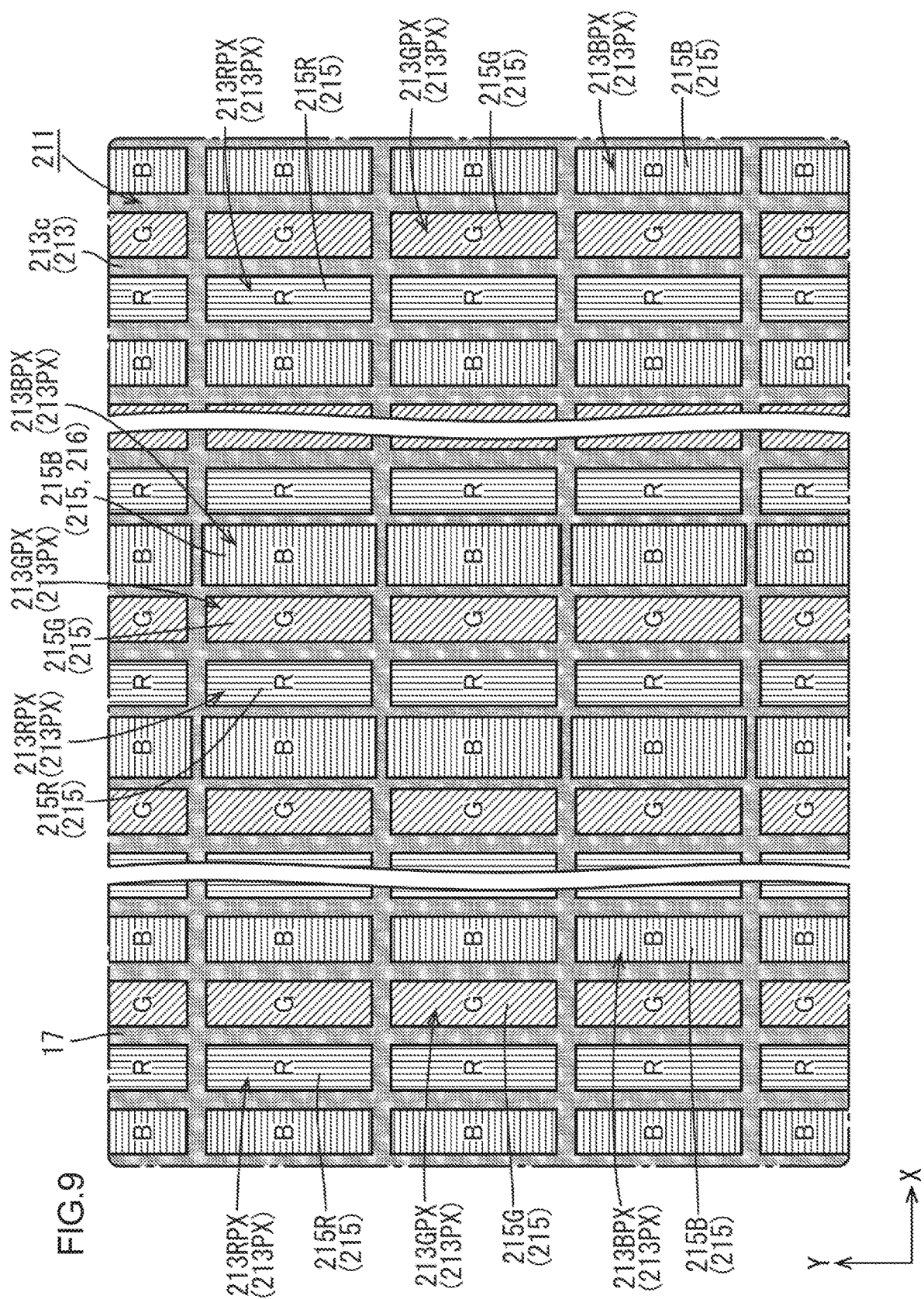
FIG. 9 is a plan view schematically illustrating a CF substrate included in a liquid crystal panel of a liquid crystal display member according to a third embodiment of the invention.
Figure 10:
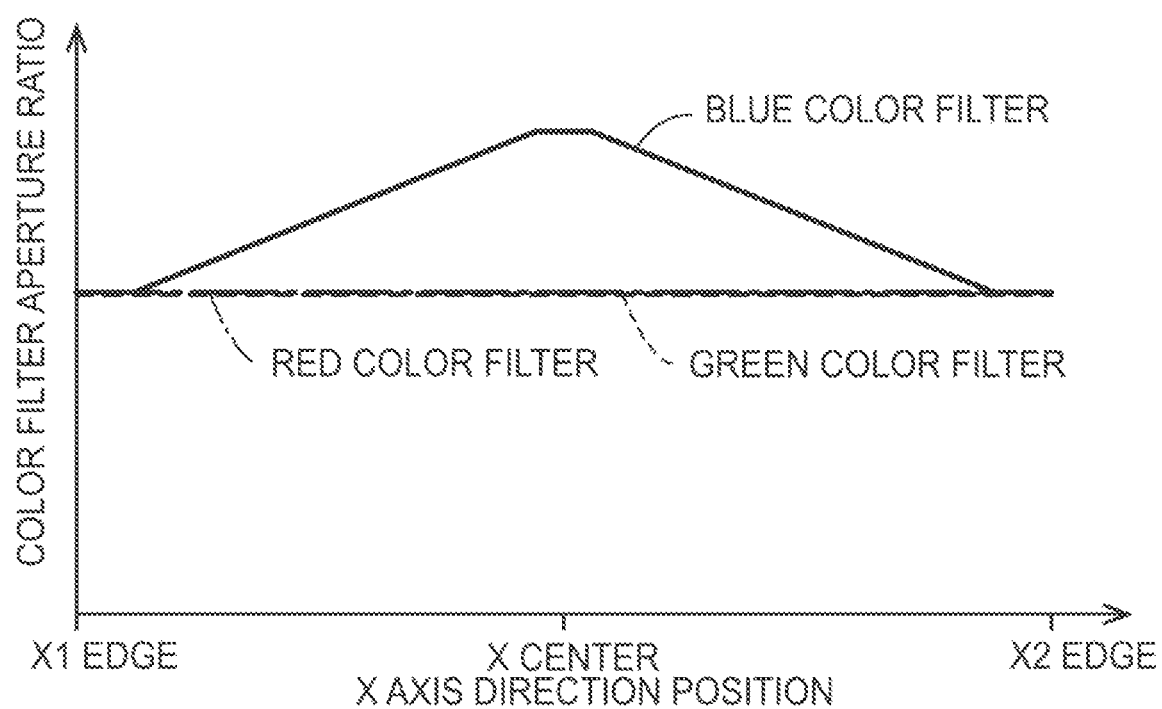
FIG. 10 is a graph indicating variations in aperture ratio for the red, green, and blue color filters in the liquid crystal panel from the X1 edge to the X2 edge.

As illustrated in FIG. 9, in the pixels 213PX of this embodiment, the aperture ratio (aperture area) of the blue pixels 213BPX and the blue color filters 215B varies with positions in the X axis direction. FIG. 9 is a plan view schematically illustrating the CF substrate 213c including color filters 215 constituting the pixels 213PX and the grid-patterned light-blocking portion 17 separating the adjacent color filters 215. When the red, green, and blue color filters 215R, 215G, and 215B of the red, green, and blue pixels 213RPX, 213GPX, and 213BPX that are located at the ends of the liquid crystal display member 211 have the same aperture ratio, the blue color filters 215B of the blue pixels 213BPX that are located in the middle of the liquid crystal display member 211 are higher in aperture ratio than both the blue color filters 215B of the blue pixels 213BPX that are located at the ends and the red color filters 215R of the red pixels 213RPX that are located in the middle. In other words, the blue color filters 215B that are located in the middle of the liquid crystal display member 211 function as the light intensity adjuster 216 in this embodiment. In this configuration, the aperture ratio of the blue pixels 213BPX and the blue color filters 215B varies as described above, but the arrangement pitch of the blue pixels 213BPX and the blue color filters 215B in the pixels 213PX and the color filters 215 is constant in the X axis direction and the Y axis direction. The light-blocking portion 17 separates the color filters 215 adjacent to each other in the X axis direction and the Y axis direction to prevent color mixture.

The aperture ratio distributions of the red, green, and blue color filters 215 are described in detail with reference to FIG. 10. FIG. 10 is a graph in which the aperture ratios of the red, green, and blue color filters 215 are plotted from the X1 edge to the X2 edge in the X axis direction over the display surface of the liquid crystal panel 213. In FIG. 10, the horizontal axis indicates positions in the X axis direction, and the vertical axis indicates aperture ratios of the color filters 215. In FIG. 10, the solid line indicates aperture ratios of the blue color filters 215B, the one-dot chain line indicates aperture ratios of the red color filters 215R, and the broken line indicates aperture ratios of the green color filters 215G of the green pixels 213GPX. As indicated in FIG. 10, the green color filters 215G have the same thickness regardless of position in the X axis direction, and the red color filters 215R have the same thickness regardless of position in the X axis direction. The thickness of the green color filters 215G and the thickness of the red color filters 215R are substantially the same. In contrast, the blue color filters 215B show a gradual increase in thickness from the middle toward the edges in the X axis direction or, conversely a gradual decrease from the edges toward the middle. The aperture ratio of the blue color filters 215B that are located at the ends in the X axis direction is substantially the same as the aperture ratio of the green color filters 215G and the aperture ratio of the red color filters 215R. Thus, the blue color filters 215B that are located in the middle in the X axis direction and function as the light intensity adjuster 216 have a higher aperture ratio than both the red color filters 215R that are located in the middle and the blue color filters 215B that are located at the ends.

The amount of light passing through each of the color filters 215 changes depending on the aperture ratio. The light-blocking portion 17 blocks less light and the color filter 215 transmits more light as the aperture ratio increases, and the light-blocking portion 17 blocks more light and the color filter 215 transmits less light as the aperture ratio decreases. As illustrated in FIGS. 9 and 10, the blue color filters 215B that are located in the middle in the X axis direction have a higher aperture ratio than both the blue color filters 215B that are located at the ends and the red color filters 215R that are located in the middle and function as the light intensity adjuster 216, and thus the amount of blue light from the blue pixels 213BPX that are located in the middle is larger than both the amount of blue light from the blue pixels 213BPX that are located at the ends and the amount of red light from the red pixels 213RPX that are located in the middle. In this configuration, the lens receives more blue light in the middle than at the periphery, and the amount of blue light received by the middle of the lens is unlikely to be insufficient when compared with the amount of red light. Thus, the light passing through the middle of the lens is reliably whitened and is unlikely to be tinged with a particular color or to be yellowish.

As described above, according to this embodiment, the liquid crystal display member 211 includes the liquid crystal panel 213 including at least the blue pixels 213BPX, which release relatively short-wavelength light, and the red pixels 213RPX, which release relatively long-wavelength light, and the backlight device that applies display light to the liquid crystal panel 213. The blue pixels 213BPX include at least the blue color filters 215B that selectively transmit short-wavelength light, and the red pixels 213RPX include at least the red color filters 215R that selectively transmit long-wavelength light. The light intensity adjuster 216 includes the blue color filters 215B that are located in the middle of the liquid crystal display member 211 and higher in aperture ratio than both the blue color filters 215B that are located at the ends and the red color filters 215R that are located in the middle. In this configuration, the liquid crystal panel 213 displays an image by using light from the backlight device. The blue pixels 213BPX included in the liquid crystal panel 213 release short-wavelength light because the blue color filters 215B thereof selectively transmit short-wavelength light, and the red pixels 213RPX included in the liquid crystal panel 213 release long-wavelength light because the red color filters 215R thereof selectively transmit long-wavelength light. The amount of light passing through each of the blue color filters 215B and the red color filters 215R changes depending on the aperture ratio. The blue and red color filters 215B and 215R each transmit less light as the aperture ratio decreases and transmit more light as the aperture ratio increases. The blue color filters 215B that are located in the middle of the liquid crystal display member 211 are higher in aperture ratio than both the blue color filters 215B that are located at the ends and the red color filters 215R that are located in the middle and function as the light intensity adjuster 216, and thus the amount of short-wavelength light from the blue pixels 213BPX that are located in the middle is larger than both the amount of short-wavelength light from the blue pixels 213BPX that are located at the ends and the amount of long-wavelength light from the red pixels 213RPX that are located in the middle. In this configuration, the lens receives more short-wavelength light in the middle than at the periphery, and the amount of short-wavelength light received by the middle of the lens is unlikely to be insufficient when compared with the amount of long-wavelength light. Thus, the light passing through the middle of the lens is whitened and is unlikely to be tinged with a particular color.

Fourth Embodiment

A fourth embodiment of the invention is described with reference to FIG. 11 or 12. In the fourth embodiment, the pixels 313PX have a different configuration from the pixels in the third embodiment. Structures, operations, and effects similar to those in the first embodiment are not described.

Figure 11:
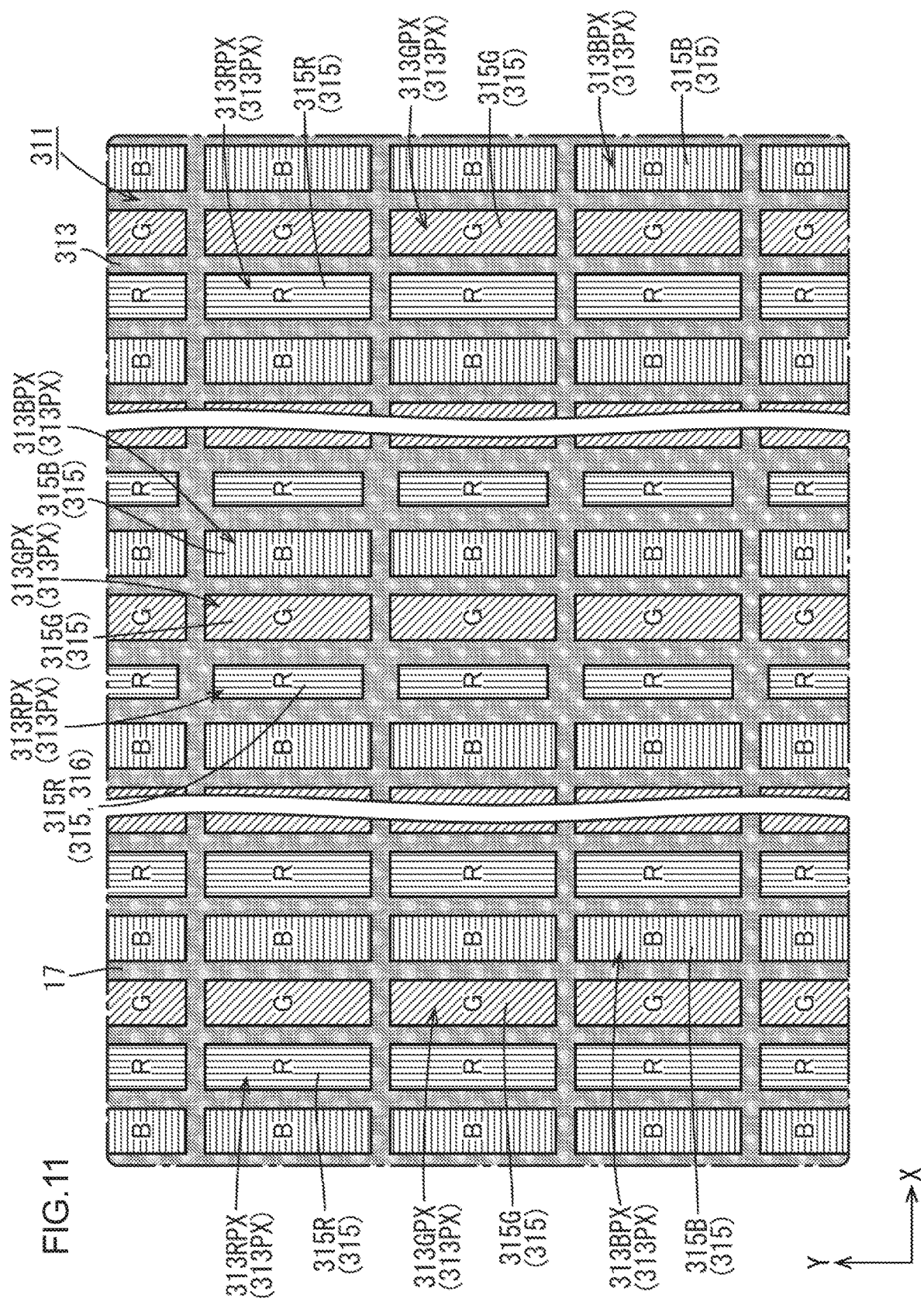
FIG. 11 a plan view schematically illustrating a CF substrate included in a liquid crystal panel of a liquid crystal display member according to a fourth embodiment of the invention.
Figure 12:
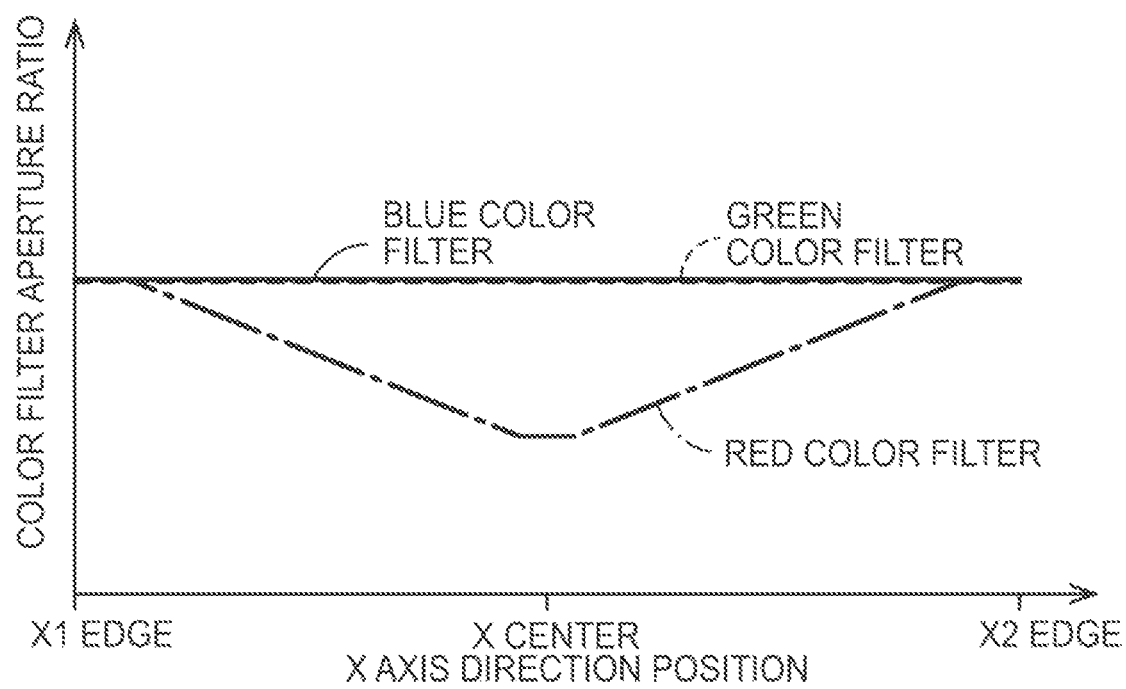
FIG. 12 is a graph indicating variations in aperture ratio for the red, green, and blue color filters in the liquid crystal panel from the X1 edge to the X2 edge.

As illustrated in FIG. 11, in the color filters 315 included in the pixels 313PX of this embodiment, the aperture ratio of the red color filters 315R vary with positions in the X axis direction. When the red, green, and blue color filters 315R, 315G, and 315B of the red, green, and blue pixels 313RPX, 313GPX, and 313BPX that are located at the ends of the liquid crystal display member 311 have the same aperture ratio, the red color filters 315R of the red pixels 313RPX that are located in the middle of the liquid crystal display member 311 are lower in aperture ratio than both the red color filters 315R of the red pixels 313RPX that are located at the ends and the blue color filters 315B of the blue pixels 313BPX that are located in the middle. In other words, the red color filters 315R that are located in the middle of the liquid crystal display member 311 function as the light intensity adjuster 316 in this embodiment.

The aperture ratio distributions of the red, green, and blue color filters 315 are described in detail with reference to FIG. 12. FIG. 12 is a graph similar to FIG. 10 in the third embodiment. As indicated in FIG. 12, the blue color filters 315B have the same aperture ratio regardless of position in the X axis direction, and the green color filters 315G of the green pixels 313GPX have the same aperture ratio regardless of position in the X axis direction. The aperture ratio of the blue color filters 315B and the aperture ratio of the green color filters 315G are substantially the same. In contrast, the red color filters 315R show a gradual increase in aperture ratio from the middle toward the edges in the X axis direction or, conversely a gradual decrease from the edges toward the middle. The aperture ratio of the red color filters 315R that are located at the ends (adjacent to the X1 edge and the X2 edge) in the X axis direction is substantially the same as the aperture ratio of the blue color filters 315B and the aperture ratio of the green color filters 315G. The red color filters 315R that are located in the middle in the X axis direction (adjacent to the X center) and function as the light intensity adjuster 316 have a lower aperture ratio than both the blue color filters 315B that are located in the middle and the red color filters 315R that are located at the ends. In this configuration, the amount of red light from the red pixels 313RPX that are located in the middle is smaller than both the amount of red light from the red pixels 313RPX that are located at the ends and the amount of blue light from the blue pixels 313BPX that are located in the middle. Thus, the lens receives less red light in the middle than at the periphery, and the amount of blue light received by the middle of the lens is unlikely to be insufficient when compared with the amount of red light. Thus, the light passing through the middle of the lens is reliably whitened and is unlikely to be tinged with a particular color or to be yellowish.

As described above, according to this embodiment, the liquid crystal display member 311 includes the liquid crystal panel 313 including at least the blue pixels 313BPX, which release relatively short-wavelength light, and the red pixels 313RPX, which release relatively long-wavelength light, and the backlight device that applies display light to the liquid crystal panel 313. The blue pixels 313BPX include at least the blue color filters 315B that selectively transmit short-wavelength light, and the red pixels 313RPX include at least the red color filters 315R that selectively transmit long-wavelength light. The light intensity adjuster 316 includes the red color filters 315R that are located in the middle of the liquid crystal display member 311 and lower in aperture ratio than both the red color filters 315R that are located at the ends and the blue color filters 315B that are located in the middle. In this configuration, the liquid crystal panel 313 displays an image by using light from the backlight device. The blue pixels 313BPX included in the liquid crystal panel 313 release short-wavelength light because the blue color filters 315B thereof selectively transmit short-wavelength light, and the red pixels 313RPX included in the liquid crystal panel 313 release long-wavelength light because the red color filters 315R thereof selectively transmit long-wavelength light. The amount of light passing through each of the blue and red color filters 315B and 315R changes depending on the aperture ratio. The blue and red color filters 315B and 315R each transmit less light as the aperture ratio decreases and transmit more light as the aperture ratio increases. The red color filters 315R that are located in the middle of the liquid crystal display member 311 have a lower aperture ratio than both the red color filters 315R that are located at the ends and the blue color filters 315B that are located in the middle and function as the light intensity adjuster 316, and thus the amount of long-wavelength light from the red pixels 313RPX that are located in the middle is smaller than both the amount of long-wavelength light from the red pixels 313RPX that are located at the ends and the amount of short-wavelength light from the blue pixels 313BPX that are located in the middle. In this configuration, the lens receives less long-wavelength light in the middle than at the periphery, and the amount of short-wavelength light received by the middle of the lens is unlikely to be insufficient when compared with the amount of long-wavelength light. Thus, the light passing through the middle of the lens is unlikely to be tinged with a particular color.

Fifth Embodiment

Figure 13:
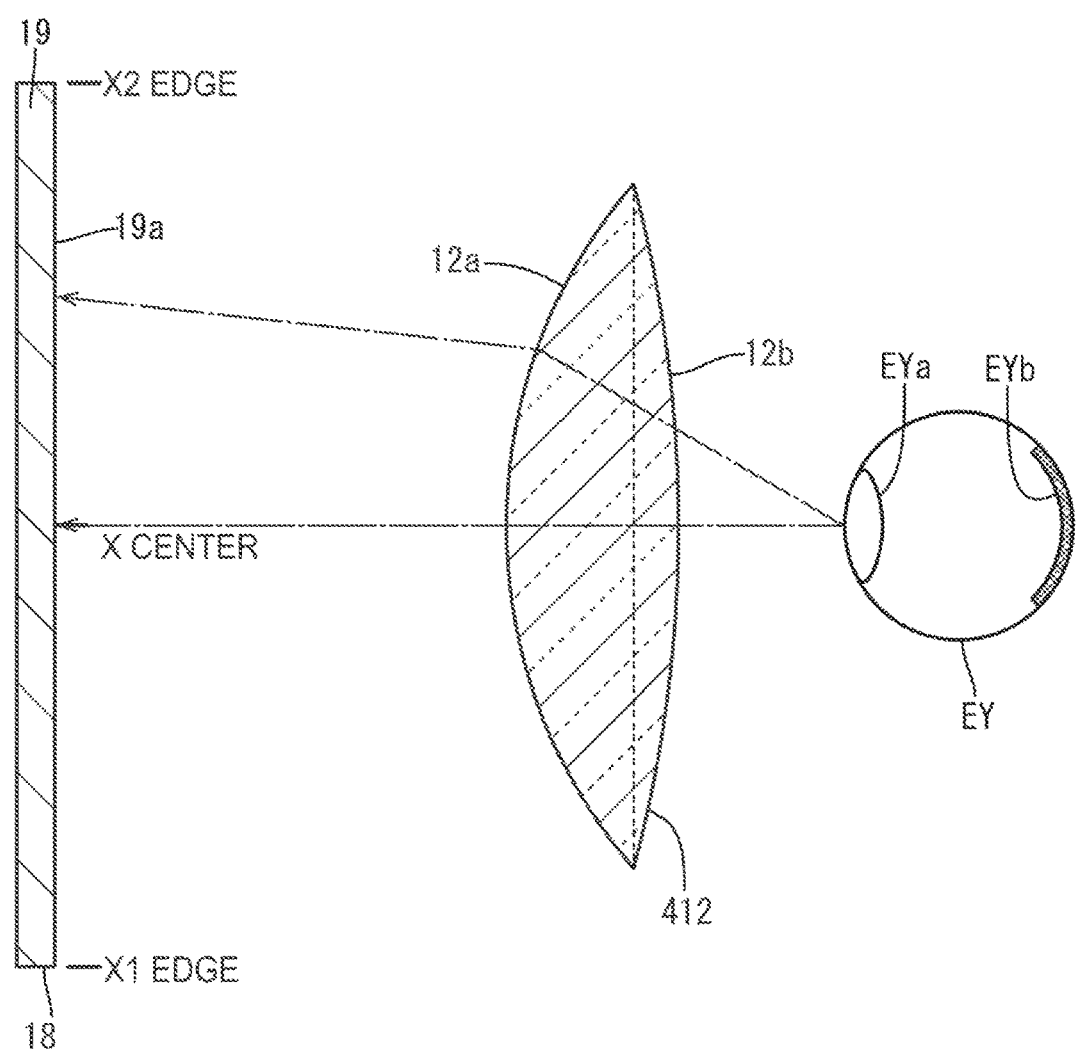
FIG. 13 is a side view illustrating an organic EL display member according to a fifth embodiment of the invention, a lens, and an eyeball of a user.

A fifth embodiment of the invention is described with reference to FIGS. 13 to 15. In the fifth embodiment, an organic EL display device 18 is employed instead of the liquid crystal display device 10 in the first embodiment. Structures, operations, and effects similar to those of the first embodiment are not described.

In this embodiment, an organic EL display device (display device) 18, which is a light-emitting display device, is described. As illustrated in FIG. 13, the organic EL display device 18 does not include the backlight device 14, which is included in the liquid crystal display device 10 of the first embodiment, but includes the light-emitting organic EL display member (display member) 19. The display surface 19a of the organic EL display member 19 on which an image is displayed extends in the X axis direction and the Y axis direction in the drawings. The direction normal to the display surface 19a extends in the Z axis direction as the liquid crystal panel 13 of the first embodiment. The organic EL display member 19 includes at least two substrates (not illustrated) and light emitting portions 20 constituting the pixels 19PX and TFTs (not illustrated) as switching elements, which are disposed on one of the substrates.

Figure 14:
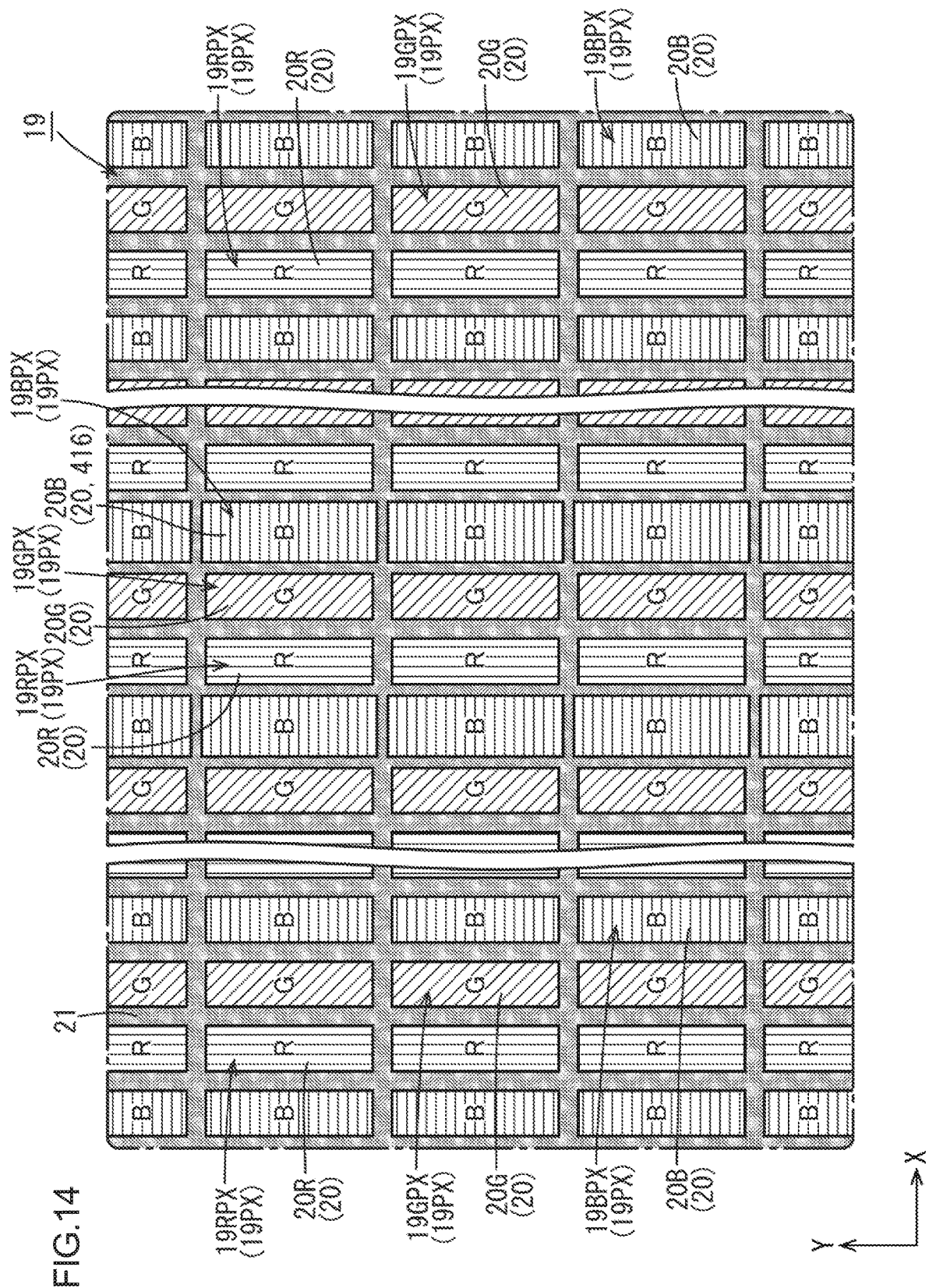
FIG. 14 is a plan view schematically illustrating a substrate included in the organic EL display member.
Figure 15:
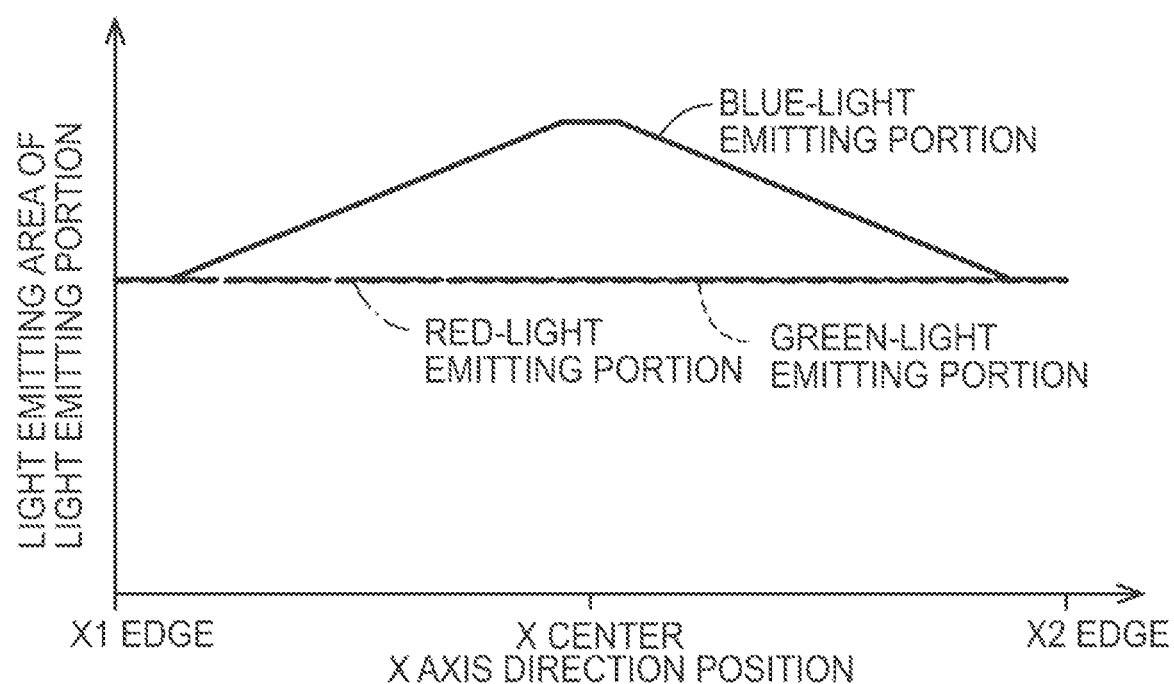
FIG. 15 is a graph indicating variations in light emitting area for red-, green-, and blue-light emitting portions in an organic EL display member from the X1 edge to the X2 edge.

As illustrated in FIG. 14, the pixels 19PX include the red pixels (long-wavelength pixels) 19RPX, which release red light, green pixels 19GPX, which release green light, and blue pixels (short-wavelength pixels) 19BPX, which release blue light. The red, green, and blue pixels 19RPX, 19GPX, and 19BPX are arranged in the X axis direction and Y axis direction in a matrix in the display surface 19a. The arrangement of the pixels 19RPX, 19GPX, and 19BPX is the same as that of the pixels 13RPX, 13GPX, and 13BPX in the first embodiment. The pixels 19PX include light emitting portions 20 that emit red, green, and blue light. The light emitting portion 20 includes an organic LED, which is driven by the TFT, and emits light in a predetermined wavelength range. The organic LED is a light-emitting element including a substrate and a laminate of a light-emitting layer formed of an organic light-emitting material and electrodes on the substrate. The light emitting portions 20 include red-light emitting portions (long-wavelength light emitting portions) 20R that emit red light, green-light emitting portions 20G that emit green light, and blue-light emitting portions (short-wavelength light emitting portions) 20B that emit blue light. The organic EL display member 19 further includes a grid-patterned light-blocking portion 21 that separates the light emitting portions 20 adjacent to each other in the X axis direction and the Y axis direction to prevent color mixture. FIG. 14 is a plan view schematically illustrating the substrate included in the organic EL display member 19.

As illustrated in FIG. 14, in the pixels 19PX in this embodiment, the light emitting area of the blue-light emitting portions 20B of the blue pixels 19BPX varies with positions in the X axis direction. When the red, green, and blue light emitting portions 20R, 20G, and 20B that are located at the ends of the organic EL display member 19 have the same light emitting area, the blue-light emitting portions 20B that are located in the middle of the organic EL display member 19 are larger in light emitting area than both the blue-light emitting portions 20B that are located at the ends and the red-light emitting portions 20R that are located in the middle and function as the light intensity adjuster 416. In this configuration, the light emitting area of the blue-light emitting portions 20B varies as described above, but the arrangement pitch of the pixels 19PX and the light emitting portions 20 is constant in the X axis direction and the Y axis direction.

The light emitting area distributions of the red-, green-, and blue-light emitting portions 20 are described in detail with reference to the figure. FIG. 15 is a graph in which the light emitting areas of the red, green, and blue-light emitting portions 20 are plotted from the X1 edge to the X2 edge in the X axis direction over the display surface 19a of the organic EL display member 19. In FIG. 15, the horizontal axis indicates positions in the X axis direction, and the vertical axis indicates light emitting areas of the light emitting portions 20. In FIG. 15, the solid line indicates the light emitting areas of the blue-light emitting portions 20B, the one-dot chain line indicates the light emitting areas of the red-light emitting portions 20R, and the broken line indicates the light emitting areas of the green-light emitting portions 20G. The positions of the X1 edge, the X center, and the X2 edge indicated in the horizontal axis in FIG. 15 correspond to the positions in FIG. 13. As indicated in FIG. 15, the green-light emitting portions 20G have the same light emitting area regardless of position in the X axis direction, and the red-light emitting portions 20R have the same light emitting area regardless of position in the X axis direction. The light emitting area of the green-light emitting portions 20G and the light emitting area of the red-light emitting portions 20R are substantially the same. In contrast, the blue-light emitting portions 20B show a gradual decrease in light emitting area from the middle toward the edges in the X axis direction or, conversely a gradual increase from the edges toward the middle. The light emitting area of the blue-light emitting portions 20B that are located at the ends in the X axis direction is substantially the same as the light emitting area of the green-light emitting portions 20G and that of the red-light emitting portions 20R. Thus, the blue-light emitting portions 20B that are located in the middle in the X axis direction and function as the light intensity adjuster 416 have a larger light emitting area than both the red-light emitting portions 20R that are located in the middle and the blue-light emitting portions 20B that are located at the ends.

The amount of light passing through the light emitting portions 20 changes depending on the light emitting area. The light emitting portion 20 emits more light as the light emitting area increases and emits less light as the light emitting area decreases. As illustrated in FIGS. 14 and 15, the blue-light emitting portions 20B that are located in the middle in the X axis direction have a larger light emitting area than both the blue-light emitting portions 20B that are located at the ends and the red-light emitting portions 20R that are located in the middle and function as the light intensity adjuster 416, and thus the amount of blue light from the blue pixels 19BPX that are located in the middle is larger than both the amount of blue light from the blue pixels 19BPX that are located at the ends and the amount of red light from the red pixels 19RPX that are located in the middle. In this configuration, the lens 412 receives more blue light in the middle than at the periphery, and the amount of blue light received by the middle of the lens 412 is unlikely to be insufficient when compared with the amount of red light. Thus, the light passing through the middle of the lens 412 is reliably whitened and is unlikely to be tinged with a particular color or to be yellowish.

As described above, according to this embodiment, the organic EL display member (display member) 19 includes at least the blue pixels 19BPX, which release relatively short-wavelength light, and the red pixels 19RPX, which release long-wavelength light. The blue pixels 19BPX include at least the blue-light emitting portions (short-wavelength light emitting portions) 20B that emit short-wavelength light, and the red pixels 19RPX include at least the red-light emitting portions (long-wavelength light emitting portions) 20R that emit long-wavelength light. The light intensity adjuster 416 includes the blue-light emitting portions 20B that are located in the middle of the organic EL display member 19 and larger in light emitting area than both the blue-light emitting portions 20B that are located at the ends and the red-light emitting portions 20R that are located in the middle. In this configuration, the blue pixels 19BPX included in the organic EL display member 19 release short-wavelength light because the blue-light emitting portions 20B thereof emit short-wavelength light, and the red pixels 19RPX included in the organic EL display member 19 release long-wavelength light because the red-light emitting portions 20R thereof emit long-wavelength light. The amount of light emitted by each of the blue-light emitting portions 20B and the red-light emitting portions 20R changes depending on the light emitting area. The blue- and red-light emitting portions 20B and 20R each emit less light as the light emitting area decreases and emit more light as the light emitting area increases. The blue-light emitting portions 20B that are located in the middle of the organic EL display member 19 have a larger light emitting area than both the blue-light emitting portions 20B that are located at the ends and the red-light emitting portions 20R that are located in the middle and function as the light intensity adjuster 416, and thus the amount of short-wavelength light from the blue pixels 19BPX that are located in the middle is smaller than both the amount of short-wavelength light from the blue pixels 19BPX that are located at the ends and the amount of long-wavelength light from the red pixels 19RPX that are located in the middle. In this configuration, the lens 412 receives more short-wavelength light in the middle than at the periphery, and the amount of short-wavelength light received by the middle of the lens 412 is unlikely to be insufficient when compared with the amount of long-wavelength light. Thus, the light passing through the middle of the lens 412 is unlikely to be tinged with a particular color.

Sixth Embodiment

A sixth embodiment of the invention is described with reference to FIG. 16 or 17. In the sixth embodiment, the pixels 519PX have a different configuration from the pixels in the fifth embodiment. Structures, operations, and effects similar to those of the first embodiment are not described.

Figure 16:
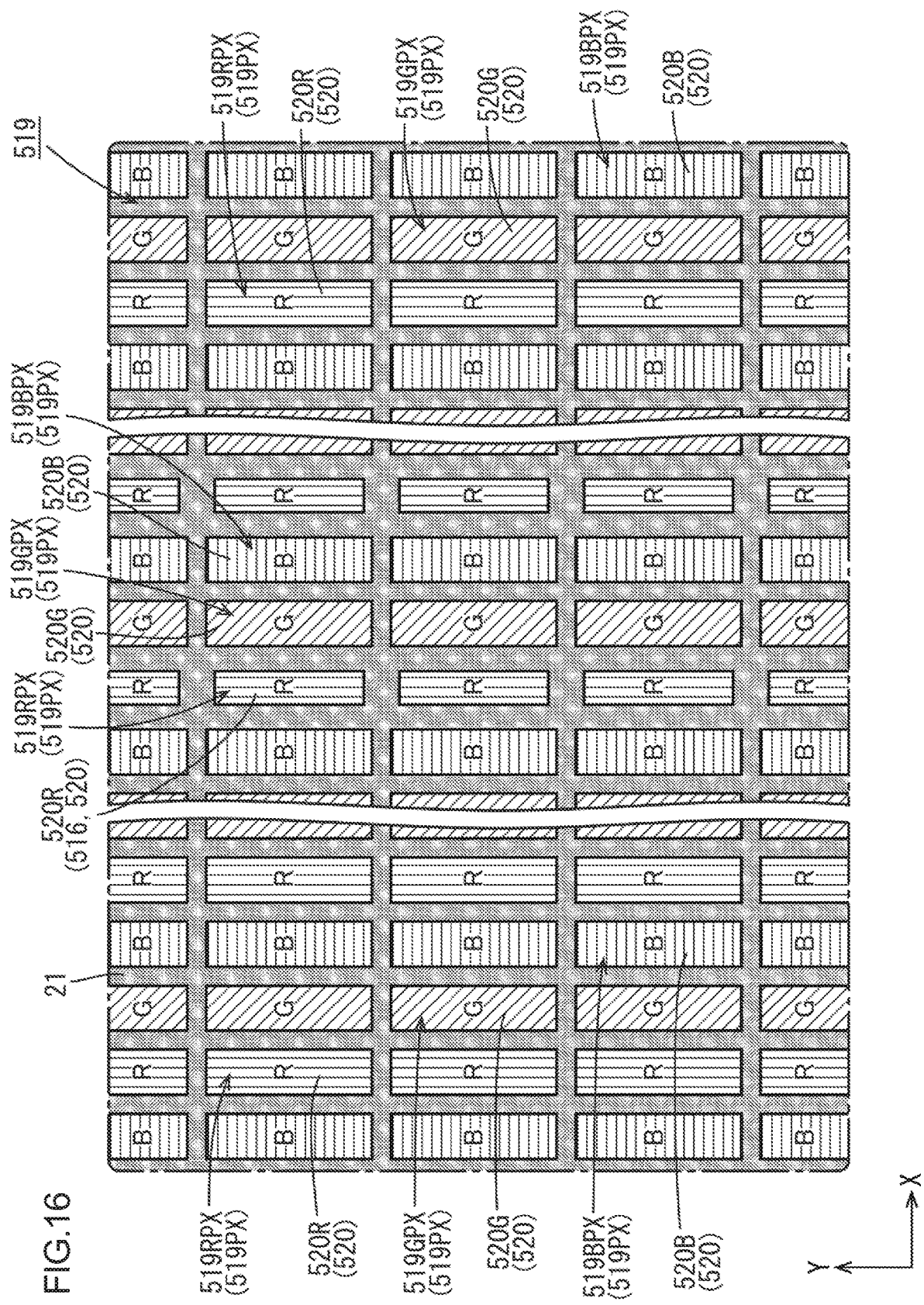
FIG. 16 is a plan view schematically illustrating a substrate included in an organic EL display member according to a sixth embodiment of the invention.
Figure 17:
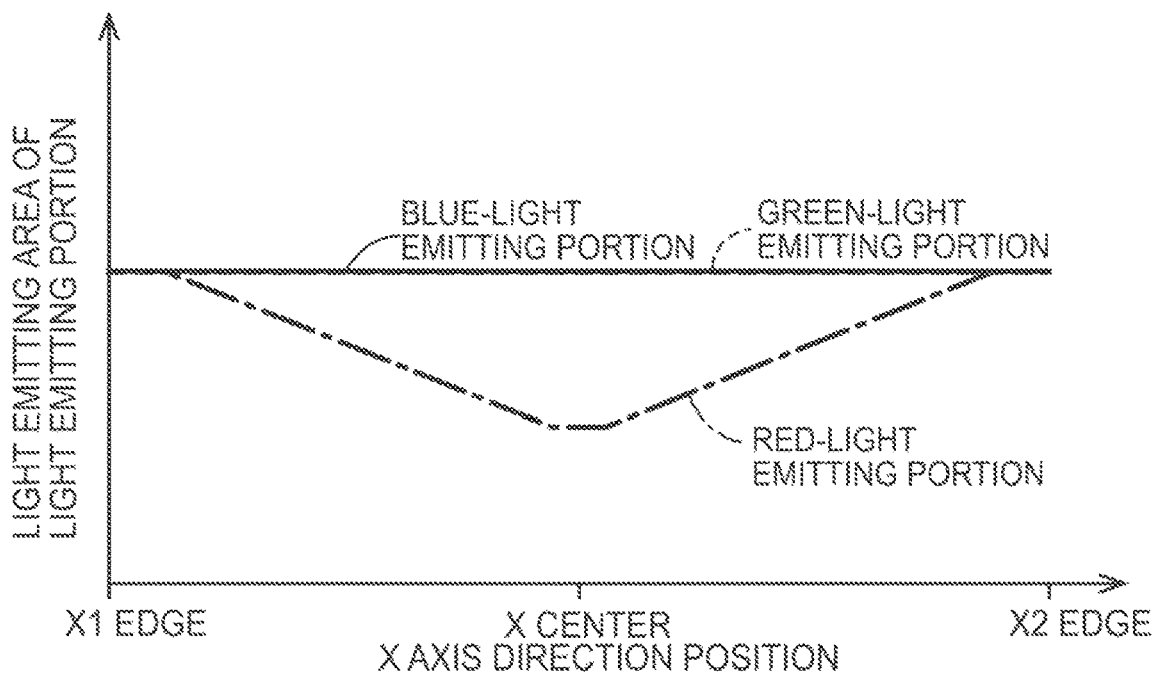
FIG. 17 is a graph indicating variations in light emitting area for the red-, green-, and blue-light emitting portions in the organic EL display member from the X1 edge to the X2 edge.

As illustrated in FIG. 16, in the pixels 519PX in this embodiment, the light emitting area of the red-light emitting portions 520R varies with positions in the X axis direction. When the red, green, and blue light emitting portions 520R, 520G, and 520B that are located at the ends of the organic EL display member 519 have the same light emitting area, the light-emitting portions 520R of the red pixels 519RPX that are located in the middle of the organic EL display member 519 are smaller in light emitting area than both the red-light emitting portions 520R that are located at the ends and the blue-light emitting portions 520B of the blue pixels 519BPX that are located in the middle. In other words, the red-light emitting portions 520R that are located in the middle of the organic EL display member 519 function as the light-intensity adjuster 516 in this embodiment.

The light emitting area distributions of the red-, green-, and blue-light emitting portions 520 are described in detail with reference to FIG. 17. FIG. 17 is a graph similar to FIG. 15 in the fifth embodiment. As indicated in FIG. 17, the blue-light emitting portions 520B have the same light emitting area regardless of position in the X axis direction, and the green-light emitting portions 520G of the green pixels 519GPX have the same light emitting area regardless of position in the X axis direction. The light emitting area of the blue-light emitting portions 520B and the light emitting area of the green-light emitting portions 520G are substantially the same. In contrast, the red-light emitting portions 520R show a gradual increase in light emitting area from the middle toward the edges in the X axis direction or, conversely a gradual decrease from the edges toward the middle. The light emitting area of the red-light emitting portions 520R that are located at the ends in the X axis direction (adjacent to the X1 edge and the X2 edge) is substantially the same as the light emitting area of the blue-light emitting portions 520B and that of the green-light emitting portions 520G. Thus, the red-light emitting portions 520R that are located in the middle in the X axis direction (adjacent to the X center) and function as the light intensity adjuster 516 have a smaller light emitting area than both the blue-light emitting portions 520B that are located in the middle and the red-light emitting portions 520R that are located at the ends. In this configuration, the amount of red light from the red pixels 519RPX that are located in the middle is smaller than both the amount of red light from the red pixels 519RPX that are located at the ends and the amount of blue light from the blue pixels 519BPX that are located in the middle. Thus, the lens receives less red light in the middle than at the periphery, and the amount of blue light received by the middle of the lens is unlikely to be insufficient when compared with the amount of red light. Thus, the light passing through the middle of the lens is reliably whitened and is unlikely to be tinged with a particular color or to be yellowish.

As described above, according to this embodiment, the organic EL display member 519 includes at least the blue pixels 519BPX, which release relatively short-wavelength light, and the red pixels 519RPX, which release relatively long-wavelength light. The blue pixels 519BPX include at least the blue-light emitting portions 520B that emit short-wavelength light and the red pixels 519RPX include at least the red-light emitting portions 520R that emit long-wavelength light. The light intensity adjuster 516 includes the red-light emitting portions 520R that are located in the middle of the organic EL display member 519 and smaller in light emitting area than both the red-light emitting portions 520R that are located at the ends and the blue-light emitting portions 520B that are located in the middle. In this configuration, the blue pixels 519BPX of the organic EL display member 519 release short-wavelength light because the blue-light emitting portions 520B thereof emit short-wavelength light, and the red pixels 519RPX of the organic EL display member 519 release long-wavelength light because the red-light emitting portions 520R thereof emit long-wavelength light. The amount of light emitted by each of the blue-light emitting portions 520B and the red-light emitting portions 520R changes depending on the light emitting area. The blue- and red-light emitting portions 520B and 520R each emit less light as the light emitting area decreases and emit more light as the light emitting area increases. The red-light emitting portions 520R that are located in the middle of the organic EL display member 519 are smaller in light emitting area than both the red-light emitting portions 520R that are located at the ends and the blue-light emitting portions 520B that are located in the middle and function as the light intensity adjuster 516, and thus the amount of long-wavelength light from the red pixels 519RPX that are located in the middle is smaller than both the amount of long-wavelength light from the red pixels 519RPX that are located at the ends and the amount of short-wavelength light from the blue pixels 519BPX that are located in the middle. In this configuration, the lens receives less long-wavelength light in the middle than at the periphery, and the amount of short-wavelength light received by the middle of the lens is unlikely to be insufficient when compared with the amount of long-wavelength light. Thus, the light passing through the middle of the lens is unlikely to be tinged with a particular color.

Other Embodiments

The present invention is not limited to the embodiments described above and illustrated by the drawings. For example, the following embodiments will be included in the technical scope of the present invention.

Figure 18:
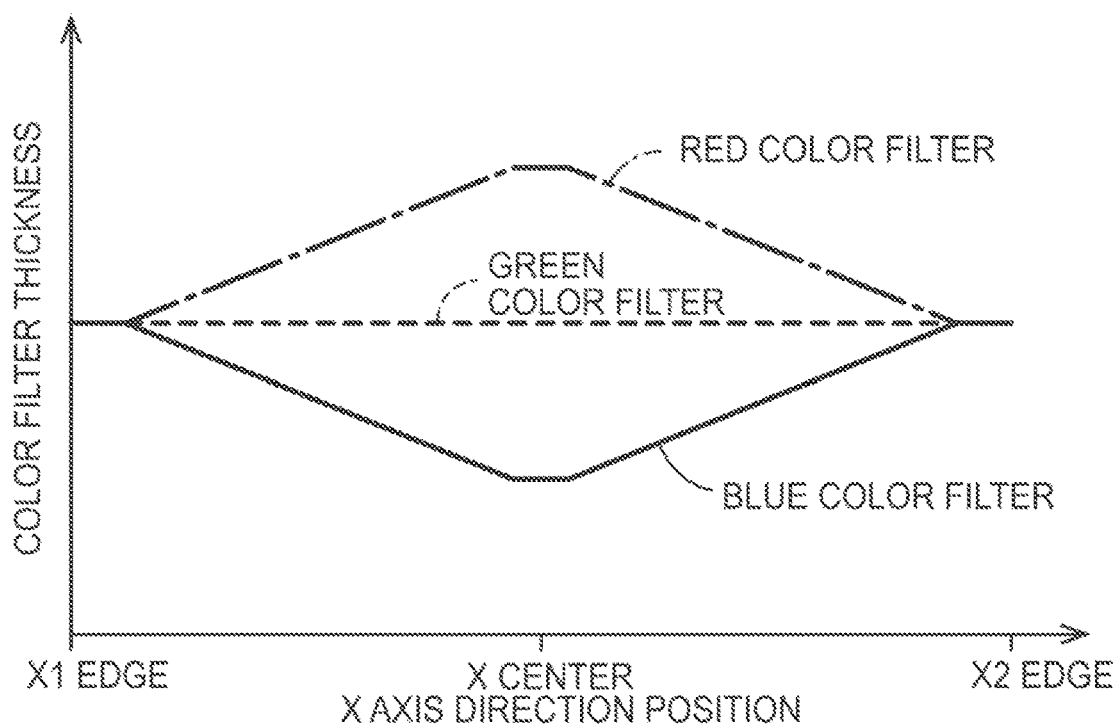
FIG. 18 is a graph indicating variations in thickness for the red, green, and blue color filters in a liquid crystal panel according to another embodiment (1) of the invention from the X1 edge to the X2 edge.

(1) The configurations of the first and second embodiments may be combined. Specifically described, in an embodiment indicated in FIG. 18, the blue color filters gradually increase in thickness from the middle toward the edges in the X axis direction or, conversely, gradually decrease from the edges toward the middle, and the red color filters gradually decrease in thickness from the middle toward the edges in the X axis direction or, conversely, gradually increase in thickness from the edges toward the middle. This enables fine-tuning of the chromaticity of light passing through the middle of the lens, allowing the light passing through the middle of the lens to be reliably whitened.

Figure 19:
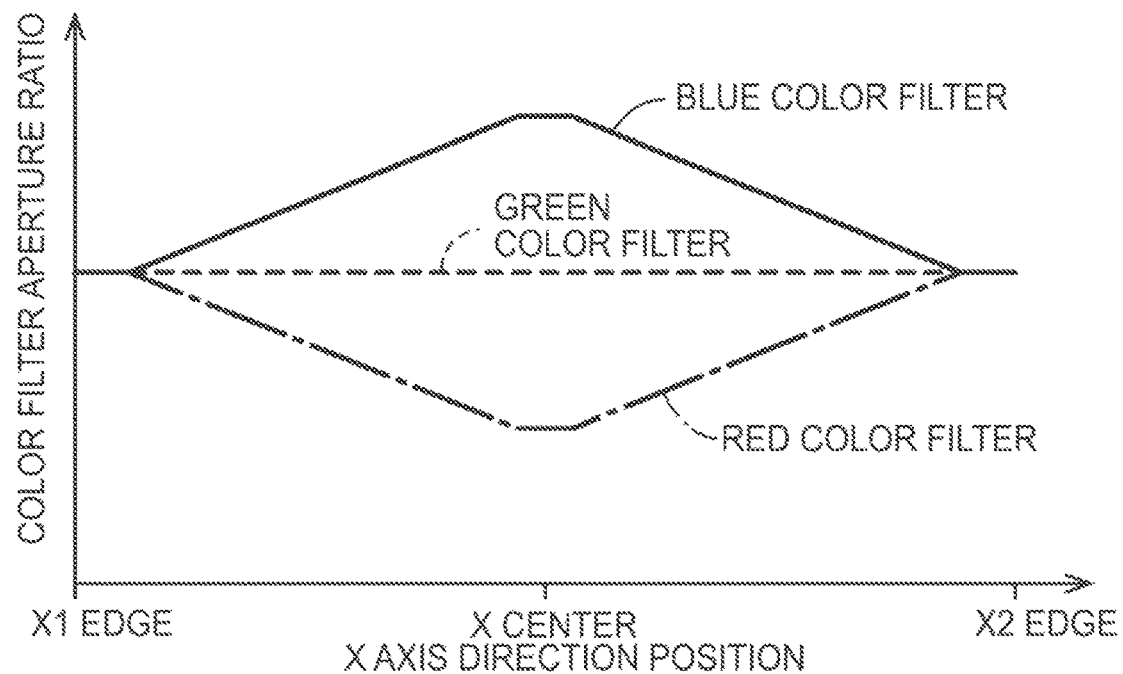
FIG. 19 is a graph indicating variations in aperture ratio for the red, green, and blue color filters in a liquid crystal panel according to another embodiment (2) of the invention from the X1 edge to the X2 edge.

(2) The configurations of the third and fourth embodiments may be combined. Specifically described, in an embodiment indicated in FIG. 19, the blue color filters gradually decrease in aperture ratio from the middle toward the edges in the X axis direction or, conversely, gradually increase in aperture ratio from the edges toward the middle, and the red color filters gradually increase in aperture ratio from the middle toward the edges in the X axis direction or, conversely, gradually decrease in aperture ratio from the edges toward the middle. This enables fine-tuning of the chromaticity of light passing through the middle of the lens, allowing the light passing through the middle of the lens to be reliably whitened.

Figure 20:
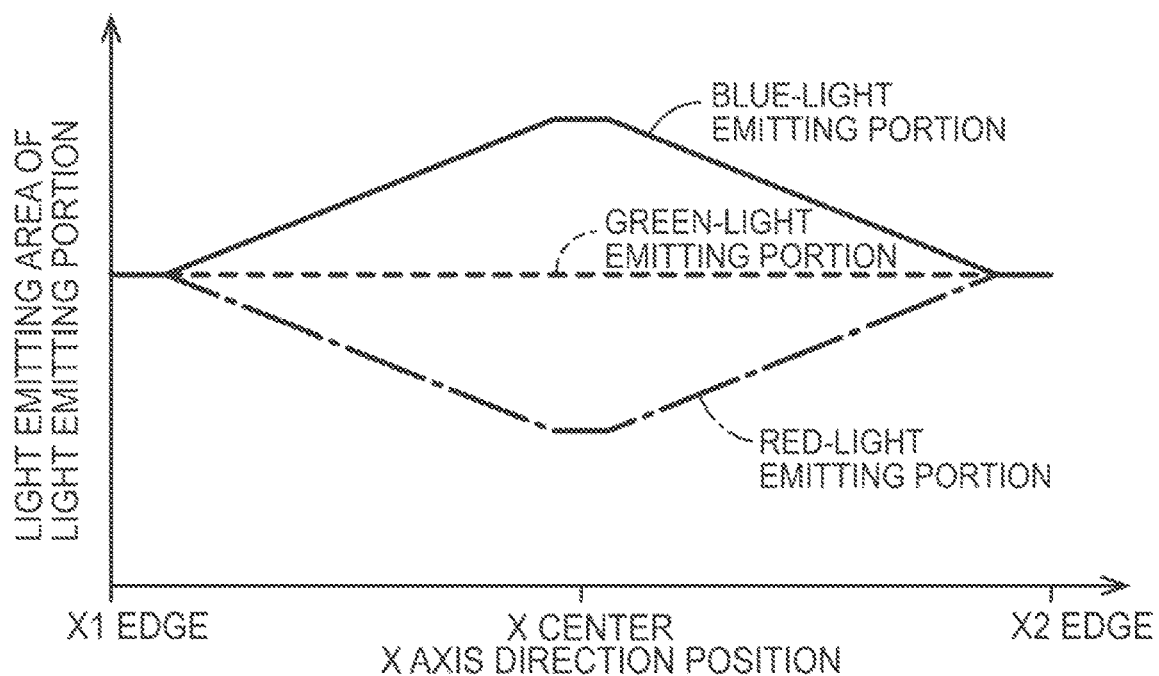
FIG. 20 is a graph indicating variations in light emitting area for the red-, green-, and blue-light emitting portions in an organic EL display member according to another embodiment (3) of the invention from the X1 edge to the X2 edge.

(3) The configurations of the fifth and sixth embodiments may be combined. Specifically described, in an embodiment indicated in FIG. 20, the blue-light emitting portions gradually decrease in light emitting area from the middle toward the edges in the X axis direction or, conversely, gradually increase in light emitting area from the edges toward the middle, and the red-light emitting portions gradually increase in light emitting area from the middle toward the edges in the X axis direction or, conversely, gradually decrease in light emitting area from the edges toward the middle. This enables fine-tuning of the chromaticity of light passing through the middle of the lens, allowing the light passing through the middle of the lens to be reliably whitened.

(4) In the above (1) to (3), the graph relating to the blue color filters or the blue-light emitting portions and the graph relating to the red color filters or the red-light emitting portions are symmetric. However, the graphs may be asymmetric.

(5) The graphs relating to the color filters and the graphs relating to the light emitting portions in the above-described embodiments may have different shapes (may represent different types of changes). For example, the graphs may show a gradual stepwise increase or decrease in values of the vertical axis with positions in the X axis direction.

(6) In the above-described embodiments, the thickness or the aperture ratio of the blue color filters or the red color filters vary or the light emitting area of the blue-light emitting portions or the red-light emitting portions vary. However, the thickness or the aperture ratio of the green color filters may vary in addition to the thickness or the aperture ratio of the blue color filters or the red color filters, or the light emitting area of the green-light emitting portions may vary in addition to the light emitting area of the blue-light emitting portions or the red-light emitting portions. This enables fine-tuning of the chromaticity of light passing through the middle of the lens, allowing the light passing through the middle of the lens to be reliably whitened.

(7) The configurations of the above-described first, third, and fifth embodiments may be combined.

(8) The configurations of the above-described second, fourth, and sixth embodiments may be combined.

(9) In a modification of the second or fourth embodiment, the thickness or the aperture ratio of the green color filters, instead of the red color filters, may vary with positions in the X axis direction. Similarly, in a modification of the sixth embodiment, the light emitting area of the green-light emitting portions, instead of the red-light emitting portions, may vary with positions in the X axis direction.

(10) In the above-described first and second embodiments, the thickness of the color filters varies. However, the amount of light released from the blue pixel and the amount of light released from the red pixel may be adjusted by changing the concentrations of the pigments dispersed or contained in the color filters.

(11) In the above-described fifth and sixth embodiments, the light emitting portions of the organic EL display member emit red light, green light, and blue light. However, the organic EL display member may include light emitting portions that emit white light and color filters that filter the white light. In such a case, the thickness of the color filters may vary as in the first or second embodiment, or the aperture ratio of the color filters may vary as in the third or fourth embodiment.

(12) In the above-described embodiments, the lens is an aspheric lens. However, the lens may be a spherical lens.

(13) In the above-described embodiments, the lens is a double convex lens. However, the lens may be a plano-convex lens.

(14) In the above-described embodiments, the liquid crystal display member and the organic EL display member are described as examples of the display member. However, the present invention is applicable to another type of display member, such as a plasma display panel (PDP) display member, an electrophoretic display panel (EPD) display member, and a micro electromechanical system (MEMS) display member.

(15) In the above-described embodiments, the head-mounted display is described as an example of a device that enlarges the image displayed on the liquid crystal display member or on the organic EL display member by using a lens. However, the present invention is applicable to other devices, such as a head-up display and a projector.

(16) In the above-described first and second embodiments, when the red, green, and blue color filters that are located at the ends of the liquid crystal display member have the same thickness, the blue color filters that are located in the middle of the liquid crystal display member are thinner than the red color filters that are located in the middle. However, if the red, green, and blue color filters that are located at the ends of the liquid crystal display member have different thicknesses, the blue color filters that are located in the middle of the liquid crystal display member may be larger or equal in thickness as the red color filters that are located in the middle.

(17) In the above-described third and fourth embodiments, when the red, green, and blue color filters that are located at the ends of the liquid crystal display member have the same aperture ratio, the blue color filters that are located in the middle of the liquid crystal display member are higher in aperture ratio than the red color filters that are located in the middle. However, if the red, green, and blue color filters that are located at the ends of the liquid crystal display member have different aperture ratios, the blue color filters that are located in the middle of the liquid crystal display member maybe lower or equal in aperture ratio as the red color filters that are located in the middle.

(18) In the above-described third and fourth embodiments, when the red-, green-, and blue-light emitting portions that are located at the ends of the organic EL display member have the same light emitting area, the blue-light emitting portions that are located in the middle of the organic EL display member are larger in light emitting area than the red-light emitting portions that are located in the middle. However, if the red-, green-, and blue-light emitting portions that are located at the ends of the organic EL display member have different light emitting areas, the blue-light emitting portions that are located in the middle of the organic EL display member may be smaller or equal in light emitting area as the red-light emitting portions that are located in the middle.

EXPLANATION OF SYMBOLS

10: liquid crystal display device (display device)
11, 111, 211, 311: liquid crystal display member (display member)
12, 412: lens
13, 113, 213, 313: liquid crystal panel (display panel)
15B, 115B, 215B, 315B: blue color filter (short-wavelength light transmissive portion)
13BPX, 113BPX, 213BPX, 313BPX: blue pixel (short-wavelength pixel)
15R, 115R, 215R, 315R: red color filter (long-wavelength light transmissive portion)
13RPX, 113RPX, 213RPX, 313RPX: red pixel (long-wavelength pixel)
14: backlight device (lighting device)
16, 116, 216, 316, 416, 516: light intensity adjuster
EY: eyeball (eye)
EYa: crystalline lens (eye)
EYb: retina (eye)
HD: head
HMD: head-mounted display
HMDa: head-mounted device
18: organic EL display device (display device)
19, 519: organic EL display member (display member)
19BPX, 519BPX: blue pixel (short-wavelength pixel)
19RPX, 519RPX: red pixel (long-wavelength pixel)
20B, 520B: blue-light emitting portion (short-wavelength light emitting portion)
20R, 520R: red-light emitting portion (long-wavelength light emitting portion)

The invention claimed is:

1. A display device comprising:
a display member having a display surface on which an image is displayed, the display surface including end sections at ends of the display surface and a middle section between the end sections, wherein the display surface releases first light rays having a first wavelength and second light rays having a second wavelength that is longer than the first wavelength;
a lens configured to allow the image on the display member to be reproduced on an eye of a user, wherein the lens is thicker in a middle section thereof than at a periphery thereof; and
a light intensity adjuster included in the display member and configured to allow an amount of the first light rays to be released from the middle section of the display surface to be greater than a total amount of the first light rays to be released from the end sections of the display surface and of the second light rays to be released from the middle section of the display surface.

2. The display device according to claim 1, wherein
the display member further includes a display panel and a lighting device, the display panel includes at least first pixels that release the first light rays and second pixels that release the second light rays, and the lighting device is configured to apply display light to the display panel,
the first pixels include at least first light transmissive portions configured to selectively transmit the first light rays and the second pixels include at least second light transmissive portions configured to selectively transmit the second light rays, and
the light intensity adjuster includes the first light transmissive portions in the middle section of the display member and the first light transmissive portions in the middle section are thinner than both the first light transmissive portions at the end sections and the second light transmissive portions in the middle section.

3. The display device according to claim 1, wherein
the display member further includes a display panel and a lighting device, the display panel includes at least first pixels that release the first light rays and second pixels that release the second light rays, and the lighting device is configured to apply display light to the display panel,
the first pixels include at least first light transmissive portions configured to selectively transmit the first light rays and the second pixels include at least second light transmissive portions configured to selectively transmit the second light rays, and
the light intensity adjuster includes the second light transmissive portions in the middle section of the display surface and the second light transmissive portions in the middle section are thicker than both the second light transmissive portions at the end sections and the first light transmissive portions in the middle section.

4. The display device according to claim 1, wherein
the display member further includes a display panel and a lighting device, the display panel includes at least first pixels that release the first light rays and second pixels that release the second light rays, and the lighting device is configured to apply display light to the display panel,
the first pixels include at least first light transmissive portions configured to selectively transmit the first light rays and the second pixels include at least second light transmissive portions configured to selectively transmit the second light rays, and the light intensity adjuster includes the first light transmissive portions in the middle section of the display surface and the first light transmissive portions are higher in aperture ratio than both the first light transmissive portions at the end sections and the second light transmissive portions in the middle section.

5. The display device according to claim 1, wherein
the display member further includes a display panel and a lighting device, the display panel includes at least first pixels that release the first light rays and second pixels that release the second light rays, and the lighting device is configured to apply display light to the display panel,
the first pixels include at least first light transmissive portions configured to selectively transmit the first light rays and the second pixels include at least second light transmissive portions configured to selectively transmit the second light rays, and
the light intensity adjuster includes the second light transmissive portions in the middle section of the display surface and the second light transmissive portions are lower in aperture ratio than both the second light transmissive portions at the end sections and the first light transmissive portions in the middle section.

6. The display device according to claim 1, wherein
the display member further includes at least first pixels that release the first light rays and second pixels that release the second light rays,
the first pixels include at least first light emitting portions configured to emit the first light rays and the second pixels include at least second light emitting portions configured to emit second light rays, and
the light intensity adjuster includes the first light emitting portions in the middle section of the display surface and the first light emitting portions are larger in light emitting area than both the first light emitting portions at the end sections and the second light emitting portions in the middle section.

7. The display device according to claim 1, wherein
the display member further includes at least first pixels that release the first light rays and second pixels that release the second light rays, the first pixels include at least first light emitting portions configured to emit the first light rays and the second pixels include at least second light emitting portions configured to emit the second light rays, and
the light intensity adjuster includes the second light emitting portions in the middle section of the display surface and the second light emitting portions are smaller in light emitting area than both the second light emitting portions at the end sections and the first light emitting portions in the middle section.

8. The display device according to claim 1, wherein
the display member includes at least first pixels that release the first light rays and second pixels that release the second light rays, and
the first pixels are blue pixels that release at least blue light as the first light rays, and the second pixels are red pixels that release at least red light as the second light rays.

9. A head-mounted display comprising at least:
the display device according to claim 1; and
a head-mounted device holding the display device and to be worn on a head of the user.

* * * * *